(12) United States Patent
Takahashi et al.

(10) Patent No.: US 9,348,200 B2
(45) Date of Patent: May 24, 2016

(54) LIGHT SOURCE UNIT AND PROJECTOR INCORPORATING THE SAME

(71) Applicants: Tatsuya Takahashi, Shinagawa-ku (JP); Kazuhiro Fujita, Machida (JP); Toshiharu Murai, Kawasaki (JP); Takehiro Nishimori, Yokohama (JP); Ikuo Maeda, Sagamihara (JP)

(72) Inventors: Tatsuya Takahashi, Shinagawa-ku (JP); Kazuhiro Fujita, Machida (JP); Toshiharu Murai, Kawasaki (JP); Takehiro Nishimori, Yokohama (JP); Ikuo Maeda, Sagamihara (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 14/202,482

(22) Filed: Mar. 10, 2014

(65) Prior Publication Data
US 2014/0268069 A1     Sep. 18, 2014

(30) Foreign Application Priority Data

Mar. 14, 2013   (JP) .................................. 2013-051317
Nov. 19, 2013   (JP) .................................. 2013-239253

(51) Int. Cl.
*F21K 99/00*   (2010.01)
*G03B 21/14*   (2006.01)
*G03B 21/20*   (2006.01)
*G03B 33/08*   (2006.01)

(52) U.S. Cl.
CPC ............ *G03B 21/142* (2013.01); *G03B 21/204* (2013.01); *G03B 21/2046* (2013.01); *G03B 21/2066* (2013.01); *G03B 33/08* (2013.01)

(58) Field of Classification Search
CPC ............... G02B 26/008; G03B 21/204; G03B 21/2066; G03B 21/142; G03B 21/2013; G03B 21/2033; H04N 9/3161; H04N 9/3114; F21K 9/56
USPC .................. 353/30, 31, 98; 362/259, 282, 84
See application file for complete search history.

(56) References Cited

U.S. PATENT DOCUMENTS

| | | | |
|---|---|---|---|
| 2011/0096297 A1 | 4/2011 | Ogino et al. | |
| 2011/0261326 A1* | 10/2011 | Wang | G02B 26/0833 353/31 |
| 2012/0262677 A1 | 10/2012 | Ogino et al. | |
| 2013/0010264 A1* | 1/2013 | Takahashi | H04N 9/3114 353/20 |
| 2013/0021582 A1* | 1/2013 | Fujita | G03B 21/204 353/31 |
| 2013/0077055 A1* | 3/2013 | Wang | H04N 9/3105 353/31 |
| 2013/0100423 A1* | 4/2013 | Yamagishi | G03B 33/08 353/98 |
| 2013/0278902 A1* | 10/2013 | Chen | G03B 21/204 353/31 |

FOREIGN PATENT DOCUMENTS

JP        2011-095388        5/2011

\* cited by examiner

*Primary Examiner* — Christina Riddle
*Assistant Examiner* — Christopher Lamb, III
(74) *Attorney, Agent, or Firm* — Oblon, McClelland, Maier & Neustadt, L.L.P

(57) ABSTRACT

A light source unit emitting a light on an optical axis includes a first light emitter to emit a light in a certain wavelength band, a second light emitter to emit a light in a wavelength band different from that of the first light emitter, a third light emitter to emit a light in a wavelength band different from those of the first and second light emitters, a lighting path through which the lights from the first, second, and third light emitters are guided to propagate on the optical axis and into which the light from the third light emitter is joined at a hindmost position in a traveling direction on the optical axis, and an optical adjuster to exert an optical effect on the light from the third light emitter and not to exert an optical effect on the light rays from the first and second light emitters.

12 Claims, 17 Drawing Sheets

LIGHT SOURCE UNIT AND PROJECTOR INCORPORATING THE SAME

CROSS REFERENCE TO RELATED APPLICATION

The present application is based on and claims priority from Japanese Patent Application No. 2013-51317, filed on Mar. 14, 2013 and No. 2013-239253, filed on Nov. 19, 2013, the disclosure of which is hereby incorporated by reference in its entirety.

BACKGROUND OF THE INVENTION

1. Field of the Invention

The present invention relates to a light source unit and a projector including the same.

2. Description of the Related Art

A projector is used at meetings, conferences or else to project information on a personal computer display. As a light source unit of a projector the use of a high intensity discharge lamp such as extra high pressure mercury lamp is known. Such a discharge lamp can realize high luminance with no cost increases but it requires a certain length of time from starting lighting to stably becoming luminous. Further, in place of the discharge lamp, solid light emitting elements such as red, green, blue light emitting diodes (LED) or organic EL element are in practical use. A projector including a light source unit using such a solid light emitting element as a light source can activate at high speed and be environment-friendly.

For instance, Japanese Patent Application Publication No. 2011-95388 discloses a light source unit which comprises a first light emitter including a phosphor to emit a light ray in a green wavelength band, a second light emitter including an LED to emit a light ray in a red wavelength band, and a third light emitter to emit a light ray in a blue wavelength band. The first light emitter uses a blue laser diode as an excitation light source and emits a laser beam to the phosphor to excite it and generate a light ray in a green wavelength band from a fluorescence from the phosphor. The three light emitters each include a condensing lens group to collect the light rays from the phosphor and LEDs for projection. The light source unit converges the color light rays from the three light emitters on a single optical axis and projects red, green, and blue light rays on the optical axis. Thus, a projector incorporating such a light source unit can guide the red, green, and blue light rays from the light source unit to an optical modulator such as DMD to control the gradation of each color light for each pixel and project a color image.

However, the optical elements thereof provided on the optical axis are configured to exert an optical effect on all the color light rays in a traveling direction. Therefore, the light source unit is not capable of individually adjust the traveling directions of the color light rays from the three light emitters.

SUMMARY OF THE INVENTION

The present invention aims to provide a light source unit which can individually adjust the traveling directions of different light rays from different light emitters.

According to one embodiment, a light source unit to emit a light ray on a single optical axis, comprises a first light emitter to emit a light ray in a certain wavelength band, a second light emitter to emit a light ray in a wavelength band different from that of the first light emitter, a third light emitter to emit a light ray in a wavelength band different from the wavelength bands of the first and second light emitters, a lighting path through which the light rays from the first, second, and third light emitters are guided to propagate on the optical axis and into which the light ray from the third light emitter is joined at a hindmost position in a light traveling direction on the optical axis, and an optical adjuster to exert an optical effect on the light ray from the third light emitter and not to exert an optical effect on the light rays from the first and second light emitters in the light traveling direction on the lighting path.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENT

Hereinafter, embodiments of a light source unit and a projector will be described in detail with reference to the accompanying drawings. Wherever possible, the same reference numbers will be used throughout the drawings to refer to the same or like parts.

First Embodiment

Figure 1:
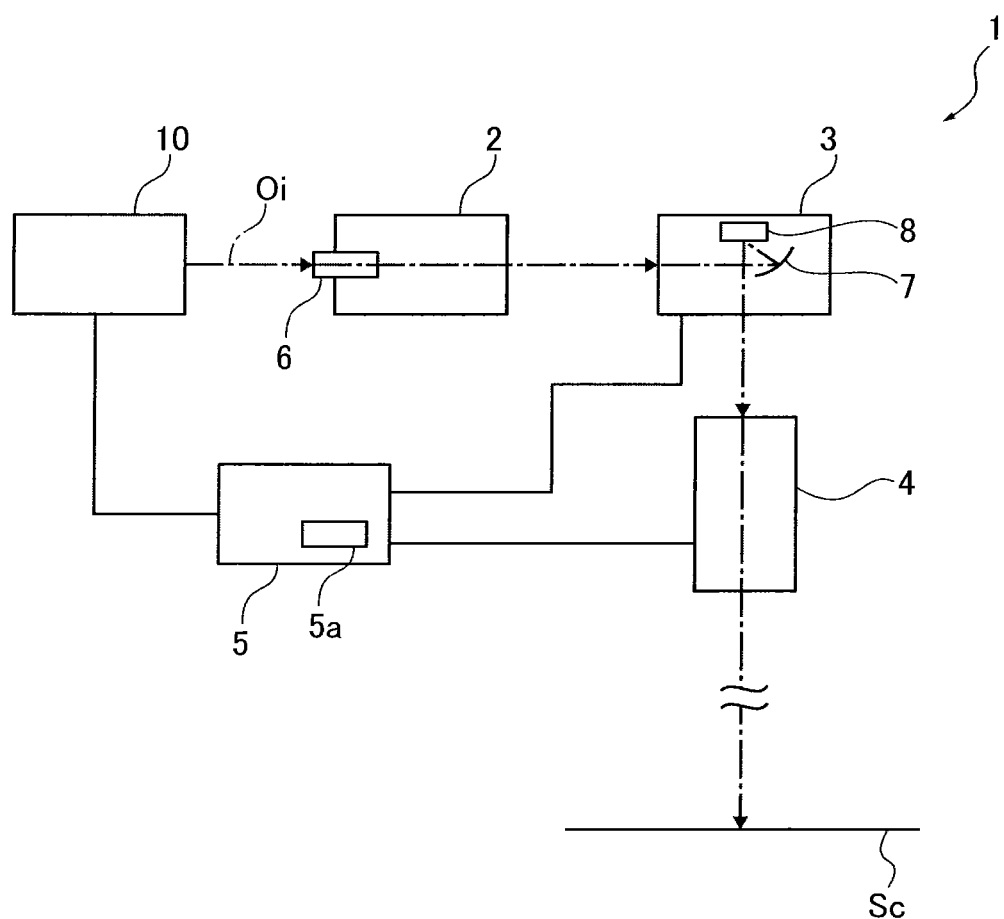
FIG. 1 shows one example of a projector incorporating a light source unit 10 according to a first embodiment.

Referring to FIG. 1, the structures of a light source unit 10 according to a first embodiment and a projector 1 comprising the same is described. The projector 1 is configured to project information on a personal computer display onto a screen Sc at meeting or the like. The projector 1 comprises a light source unit 10, an optical guide 2, an imaging unit 3, a projection system 4, and a controller 5.

The light source unit 10 is able to emit, on a single optical axis Oi, a light ray in a blue (B) wavelength band, a light ray in a red (R) wavelength band, and a light ray in a green (G) wavelength band in order or in combination. The light source unit 10 emits a light ray to the optical guide 2.

The optical guide 2 guides the light ray from the light source unit 10 to the imaging unit 3 and includes a light tunnel 6 which is a hollow tube having a mirror on an inner surface. The light tunnel 6 repeatedly reflects an incident light ray to equalize a brightness distribution of the ray or eliminate unevenness in the light amount of the ray. Although not shown, the optical guide 2 further includes an optical element such as a lens to collect the light ray with an even brightness distribution and guide it to the imaging unit 3.

The imaging unit 3 generates a full-color image based on image data from the light ray from the optical guide 2, and comprises a reflective mirror 7 and an optical modulator 8. The reflective mirror 7 reflects the light ray from the optical guide 2 to the optical modulator 8.

The optical modulator 8 adjusts the gradation of color light rays from the light source unit 10 through the optical guide 2 for each pixel to generate a color projection image. It is connected to the controller 5 and driven thereby. According to the first embodiment the optical modulator 8 is comprised of a DMD (Digital Micromirror Device), and includes a micro mirror for each pixel which is controlled by the controller 5 to be maintained at one of two different angles (two-step control). Each micro mirror is set at an angle to reflect the color light rays guided by the optical guide 2 to the projection system 4 (ON state) or at another angle to reflect the same to an internal absorber and not to emit to outside (OFF state). In the optical modulator 8 the micro mirrors are controlled in two steps individually so that a projected light can be controlled for each pixel to be displayed. Further, the optical modulator 8 can represent the gradation of an image for each pixel by adjusting the time ratio of each micro mirror in ON state by pulse width modulation (PWM), for example. In place of the DMD, the optical modulator 8 can be comprised of a liquid crystal, for example, as long as it can generate a color projection image from the color light rays emitted from the light source unit 10 and passing through the optical guide 2.

The projection system 4 projects the image generated by the optical modulator 8 of the imaging unit 3 onto the screen Sc. The projection system 4 comprises a fixed lens group contained in a fixed lens barrel and a movable lens group contained in a movable lens barrel, although not shown, to adjust focusing and zooming by moving the movable lens group.

The controller 5 includes a storage 5a and a microcomputer to collectively control the overall operation of the projector 1. It is connected to the light source unit 10, imaging unit 3, and projection system 4, to collectively control, by the program in the storage 5a, the color light projection of the light source unit 10, the projection image generation of the imaging unit 3, and focus adjustment and zoom adjustment of the projection system 4.

Further, the controller 5 comprises a not-shown interface with an external information device such as a personal computer to receive image data from the external information device and perform image processing thereon to generate image data suitable for generation of a projection image. On the basis of the generated image data, it generates a drive signal for the imaging unit 3 and outputs it thereto. Also, it generates an emission control signal in synchronization with the generated drive signal and outputs it to the light source unit 10.

The controller 5 controls the light source unit 10 by the emission control signal such that the light source unit 10 switchably emits a light in a blue wavelength band λA, a light in a green wavelength band λB and a light in a red wavelength band λC in order. It also controls the imaging unit 3 by the drive signal such that the micro mirrors of the imaging unit are individually driven in synchronization with the timing at which each color light is projected from the light source unit 10. In the projector 1 the projection system 4 projects color projection images based on the generated image data in order on the screen Sc and generates a full-color image on the screen Sc by use of the afterimage effect of the human eyes.

Next, the light source unit 10 according to the first embodiment is described with reference to FIGS. 2 to 13. For better understanding, in FIG. 2 a light tunnel 6 of the optical guide 2 as an exit position is aligned with the optical axis Oi of a lighting path Pi and the positions through which three rays of light in different wavelength bands λA, λB, λC propagate are shifted from each other on the lighting path Pi from a total reflection mirror 15 to the light tunnel 6 via second and third dichroic mirrors 19, 22 and from a fluorescent wheel 17 to a first dichroic mirror 18 via a condenser 16.

Figure 2:
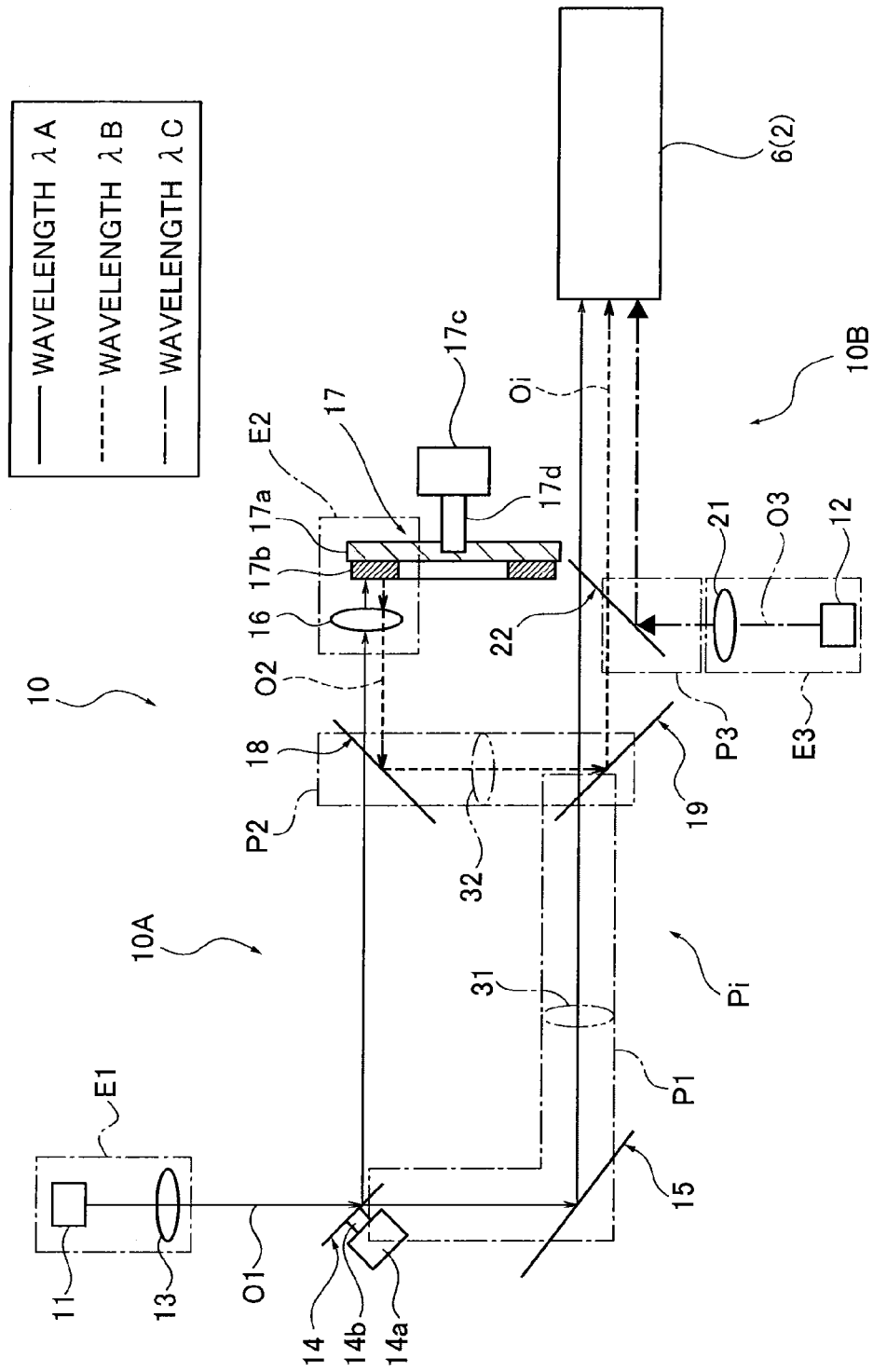
FIG. 2 is an optical diagram showing one example of the light source unit 10.

The light source unit 10 emits blue, green and red rays of light in wavelength bands λA, λB, λC on the optical axis Oi from the lighting path Pi and includes two light sources 11, 12 in FIG. 2. Thus, it comprises a first lighting system 10A with the light source 11 and a second lighting system 10B with the light source 12.

The light source 11 is a solid light emitting element to emit an excitation light as illumination. According to the first embodiment it uses a blue laser diode array to emit a blue visible laser ray in a wavelength λA (400 nm<λA<450 nm), although only a single laser diode is shown in the drawing. The light source 11 includes a phosphor 17b to generate a fluorescence with the wavelength λB and functions as an excitation light source. In place of the blue laser diode, a light emitting diode (LED) to emit a blue ray can be used. The light source 11 can be comprised of either a single or plural blue laser diodes.

The light source 12 is a solid light emitting element to emit a light ray with a wavelength λC longer than the wavelengths λA and λB. According to the first embodiment it uses a red laser diode array to emit a red visible laser ray in a wavelength λC (600 nm<λC<700 nm). The light source 12 can be comprised of either a single red laser diode or a red laser diode array.

A first lighting system 10A is comprised of a first coupling lens 13, a reflective and transmissive wheel 14, a total reflection mirror 15, a condenser 16, a fluorescent wheel 17, a first dichroic mirror 18, and a second dichroic mirror 19 in addition to the light source 11.

The first coupling lens 13 comprises at least one or more lenses to gather the light ray with the wavelength λA from the light source 11 and allow the gathered ray to be properly incident on each optical element of the first lighting system 10A in view of effectively using the light in question. The light source 11 as a first light source and the first coupling lens 13 form a first light emitter E1, and the first coupling lens 13 couples the light ray for projection. The first light emitter E1 emits a light ray with the wavelength λA on the first exit axis O1 of the first lighting system 10A. The light ray from the light source 11 gathered by the first coupling lens 13 propagates on the first exit axis O1 on which the reflective and transmissive wheel 14 is provided.

Figure 3:
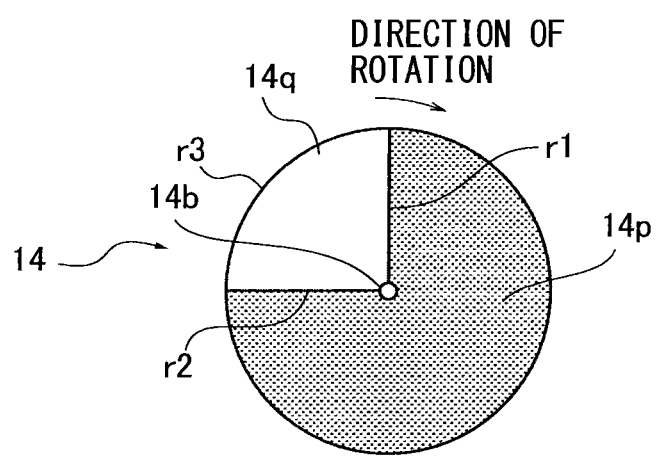
FIG. 3 is a front view of a reflective and transmissive wheel 14 on which a light ray with a wavelength $\lambda A$ is incident.

The reflective and transmissive wheel 14 is configured to switch a traveling direction of the light ray with the wavelength λA from the first light emitter E1. As shown in FIG. 3, it is a reflective element in a disc shape to totally reflect at least the light ray with the wavelength λA from the light source 11 or first light emitter E1. It includes a fan-shape transmissive area 14q surrounded by radial border lines r1, r2 and an arc r3, through which at least the light ray with the wavelength λA from the first light emitter E1 transmits. According to the first embodiment the angle range of the transmissive area 14q is 90 degrees in a rotational direction around an axial line (rotational axis 14b) and the angle range of a reflective area 14p other than the transmissive area is 270 degrees.

For the purpose of material saving, the transmissive area 14q can be formed by cutting out a part of the reflective and transmissive wheel 14. Further, by use of a diffuse plate for the transmissive area 14q, it is made possible to reduce a speckle pattern of the laser ray with the wavelength λA from the blue laser diode as the light source 11.

In FIG. 2 the reflective and transmissive wheel 14 is attached to a rotational shaft 14b of a driver 14a which is connected to and driven by the controller 5 to generate a rotational force via the rotational shaft 14b. The rotational shaft 14b is fixed to the axial line of the reflective and transmissive wheel 14 so that the reflective and transmissive wheel 14 is rotated about the rotational shaft 14b along with the driving of the driver 14a under the control of the controller 5. The reflective and transmissive wheel 14 is inclined relative to a traveling direction of the light ray so that the transmissive area 14q or reflective area 14p in FIG. 3 is on the first exit axis O1. In the first embodiment the inclination angle is set to 45 degrees.

While the transmissive area 14q is on the first exit axis O1, the reflective and transmissive wheel 14 transmits the light ray with the wavelength λA from the light source 11 therethrough, which is hereinafter referred to as a transmissive path of the first lighting system 10A. Further, while the reflective area 14p is on the first exit axis O1, the reflective and transmissive wheel 14 reflects the light ray with the wavelength λA from the light source 11 at angle of 45 degrees (inclination angle), which is hereinafter referred to as a reflective path of the first lighting system 10A. Thus, when rotated about the rotational shaft 14b, the reflective and transmissive wheel 14 functions as an optical path switch to switch a traveling direction of the light ray from the first light emitter E1 or light source 11.

The angle range of the reflective area 14p of the reflective and transmissive wheel 14 can be set to an arbitrary value other than 270 degrees. Further, in place of the reflective and transmissive wheel 14, the optical path switch can be another structure as long as it can switch a traveling direction of the light ray from the first light emitter E1. For example, the reflective and transmissive wheel 14 can be a plate including divided reflective and transmissive areas 14p, 14q to reciprocatively move in a direction of the division to switch the reflective and transmissive areas 14p, 14q on the first exit axis O1.

The first lighting system 10A includes the total reflection mirror 15 on the transmissive path through which the light ray with the wavelength λA propagates. The total reflection mirror 15 is disposed, opposing the first light emitter E1 across the reflective and transmissive wheel 14 on the first exit axis, to totally reflect, to the optical axis Oi, at least the light ray with the wavelength λA traveling on the first exit axis O1. The total reflection mirror 15 is provided at the intersection of the first exit axis O1 and the optical axis Oi as a first reflective element to reflect the light ray from the first light emitter E1. The light ray having propagated through the transmissive area 14q of the reflective and transmissive wheel 14 is reflected by the total reflection mirror 15 to the first exit axis O1. In the transmissive path of the first lighting system 10A the total reflection mirror 15 functions to converge the light ray with the wavelength λA on the optical axis Oi on which the other color light rays emit. The total reflection mirror 15 converges a first exit path P1 on a common path of the lighting path Pi through which all the color light rays pass.

Figure 4:
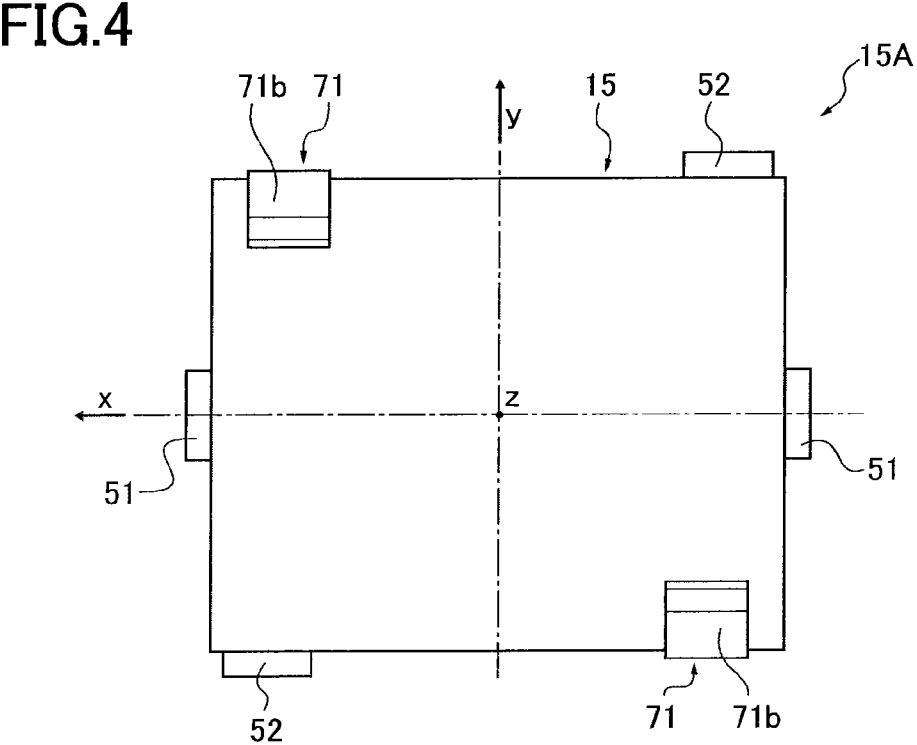
FIG. 4 shows an angle adjust mechanism 15A which includes a total reflection mirror 15 on a support 50, seen from a reflection surface or +z axis.
Figure 5:
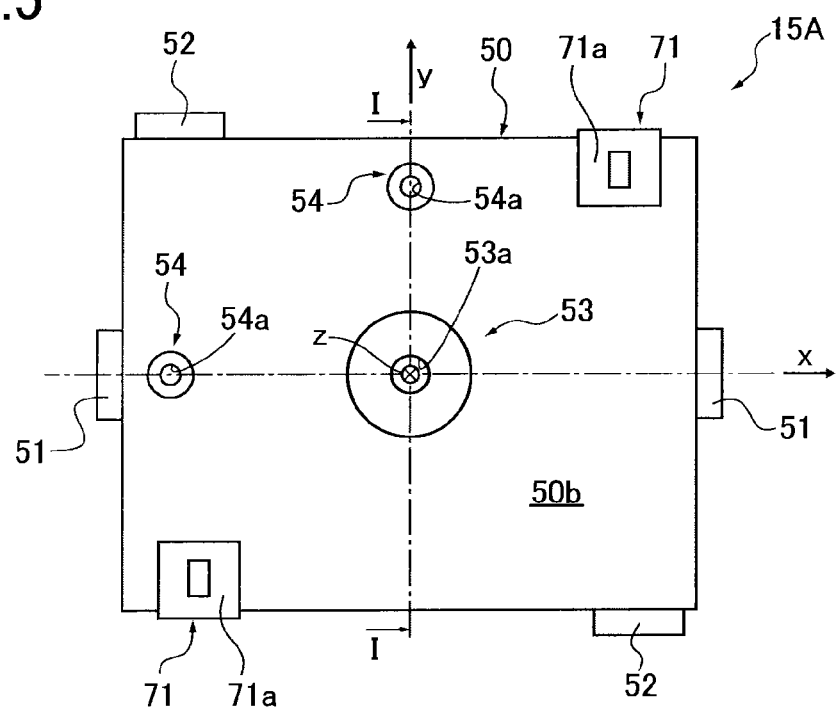
FIG. 5 shows a back surface 50b of the support 50 of the total reflection mirror 15 in the angle adjust mechanism 15A.
Figure 6:
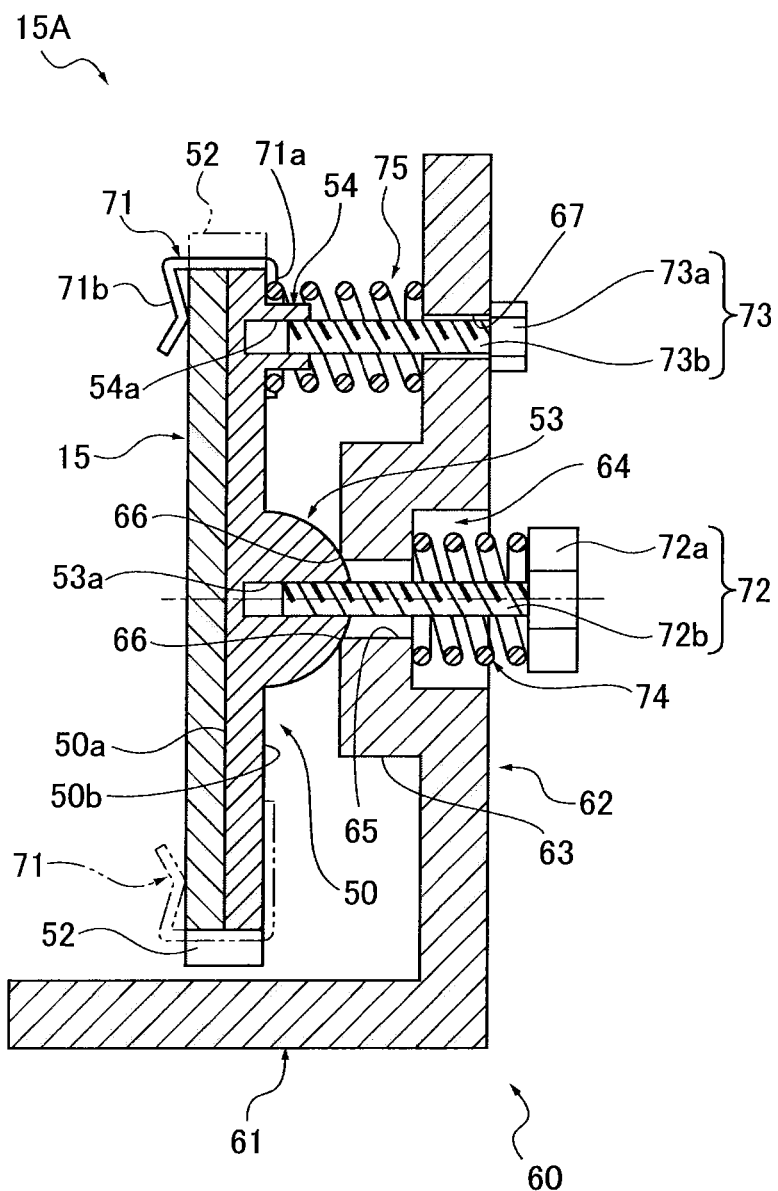
FIG. 6 is a cross section view of the angle adjust mechanism 15A in which the total reflection mirror 15 is placed on a mount 60 via the support 50 along the I to I line in FIG. 5.
Figure 7:
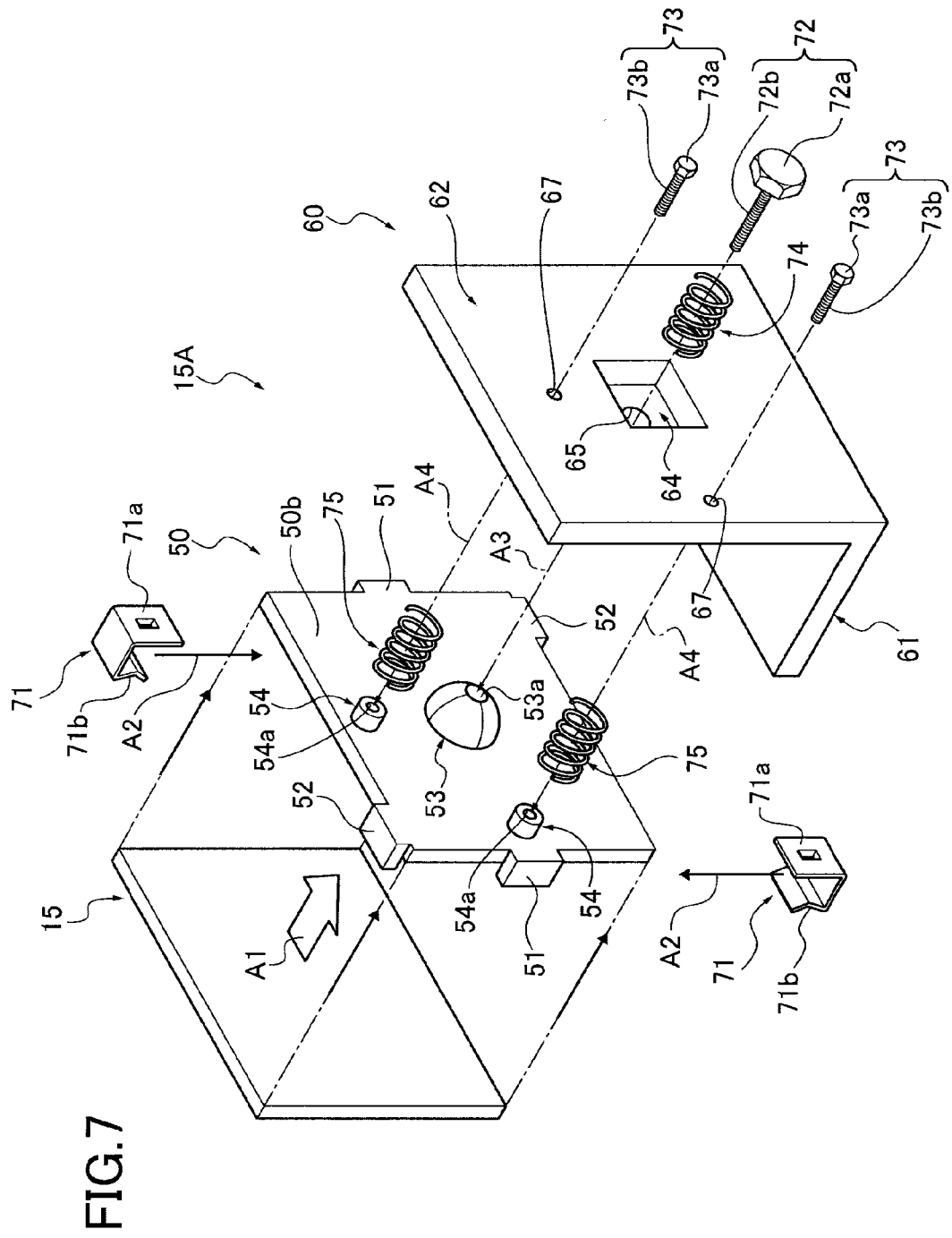
FIG. 7 is a perspective, exploded view of the structure of the angle adjust mechanism 15A.

As shown in FIGS. 4 to 7, the total reflection mirror 15 is a plate having a rectangular reflective surface and the angle thereof is adjustable by an angle adjust mechanism 15A in FIGS. 6, 7. The angle adjust mechanism 15A comprises a mirror support 50 and a mount 60. The total reflection mirror 15 is placed on the mount 60 via the support 50.

The mirror support 50 is a rectangular plate of the same size as that of the total reflection mirror 15. In FIGS. 4, 5 the direction parallel to a pair of horizontal peripheries of the total reflection mirror 15 or support 50 is defined to be x axis, the direction parallel to a pair of vertical peripheries thereof is defined to be y axis, and the x and y axes cross at the center of the mirror support 50. The direction orthogonal to the x and y axes is defined to be z axis. The z axis is orthogonal to the total reflection mirror 15 and support 50 and the reflective surface of the total reflection mirror 15 is defined to be on +z axis side.

In FIG. 4 to FIG. 7 the mirror support 50 includes a pair of first protrusions 51 on the x axis peripheries and two second protrusions 52 on the y axis peripheries. The first and second protrusions 51, 52 protrude to +z axis from the surface 50a of the peripheries defining the rectangular shape. The first protrusions 51 on the x axis peripheries are at the center of the y axis while the second protrusions 52 are approximately at opposing corners. When the total reflection mirror 15 is placed on the surface 50a, the four peripheries thereof contact the first and second protrusions 51, 52, respectively. Thereby, the total reflection mirror 15 is properly positioned on the mirror support 50 along an x to y plane. Thus, the first protrusion pair 51 and two second protrusion 52 work as a positioning frame for the total reflection mirror 15 along the x to y plane.

The positioned total reflection mirror 15 is fixed to the mirror support 50 by a pair of springs 71. The springs 71 are in a U-shape with two opposing portions 71a, 71b and form an elastic member to exert an elastic force against an extension to the space between the opposing portions 71a, 71b. By placing the opposing portion 71a on the back surface 50b of the mirror support 50 and the opposing portion 71b on the reflective surface thereof, the total reflection mirror 15 on the mirror support 50 are secured in between the opposing portions. A tip end of the opposing portion 71b is bent to separate away from the opposing portion 71a. Because of this, the springs 71 can easily place the total reflection mirror 15 on the support 50 in between them and prevent the reflective surface of the total reflection mirror 15 from being damaged.

Further, the mirror support 50 includes a fulcrum 53 and two screw bosses 54 on the back surface 50b. The fulcrum 53 is semispherical and protrudes from the back surface 50b to −z axis, and the center thereof coincides with the center of the mirror support 50 as the center of the xyz coordinate system. The fulcrum 53 has a screw hole 53a with an axis matching the z axis and a groove to fit into a thread of a later-described screw 72 on an inner circumference.

One of the bosses 54 is provided near the edge of the mirror support 50 on the x axis (left end in FIG. 5) while the other is near the edge thereof on the y axis (top end in FIG. 5). They are in a columnar shape protruding from the back surface 50b to the −z axis, and each include a screw hole 54a with an axis extending in a direction parallel to the z axis and a groove to fit into a thread of an adjusting screw 73. The mirror support 50 is rotatable about the x and y axes and supported by the mount 60.

In FIGS. 6 and 7 the mount 60 includes a plate 61 and a plate 62 orthogonally continuing with the plate 61. The plate 61 is for mounting the total reflection mirror 15 on the support 50 inside the light source unit 10, and fixed at a certain position to properly position the total reflection mirror 15, as described above. The structure of the mount 60 should not be limited to the above plates 61, 62 and can be arbitrarily set in accordance with the position at which it is mounted inside the light source unit 10.

The plate 62 is larger than the mirror support 50 and includes a convexity 63 in FIG. 6 formed by partially protruding the center of the mirror support 50 to +z axis. A concave 64 is formed on a back side (−z axis side) of the convexity 63. The convexity 63 is in a rectangular shape as seen from the z axis, and includes a through hole 65 at the center.

The through hole 65 penetrates through the concave 64 of the convexity 63 along the z axis and has an inner diameter to allow a shaft 72b of a fulcrum screw 72 to be inserted but inhibit a thread 72a thereof from being inserted. The shaft 72b of the fulcrum screw 72 is inserted into the through hole 65 with a margin to allow the fulcrum screw 72 to be inclined for the purpose of adjusting the angle of the total reflection mirror 15.

Further, the through hole 65 includes seating surfaces 66 in FIG. 6 formed by cutting out the end of the through hole 65. The seating surfaces 66 are semispherical to fit with the outer shape of the fulcrum 53, to rotatably receive the fulcrum 53 around the center thereof.

Further, in FIG. 7 the plate 62 includes two through holes 67 along the z axis. The inner diameter of the through holes 67 are set to allow a shaft 73b of an adjusting screw 73 to be inserted but inhibit a thread 73a thereof from being inserted. The shaft 73b of the adjusting screw 73 is inserted into the through hole 67 with a margin to allow the adjusting screw 73 to be inclined for the purpose of adjusting the angle of the total reflection mirror 15. While the axial line of the through hole 65 is aligned with the z axis, one of the through holes 67 is near the periphery of the plate 62 (left end in FIG. 7) on the x axis and the other is near the same on the y axis (top end in FIG. 7). When the through hole 65 is aligned with the screw hole 53a of the fulcrum 53, the axes of the two through holes 67 coincide with those of the corresponding screw holes 54a of the bosses 54.

According to the angle adjust mechanism 15A the mirror support 50 is attached to the plate 62 with the fulcrum screw 72, the two adjusting screws 73, a coil spring 74, and two adjusting coil springs 75. The fulcrum screw 72 in FIGS. 6, 7 includes a columnar thread 72a and a long shaft 72b. The outer diameter of the thread 72a is larger than the inner diameter of the through hole 65 of the plate 62 and that of the coil spring 74. The outer diameter of the shaft 72b is smaller than the outer diameter of the thread 72a and the inner diameter of the through hole 65, and approximately equal to the inner diameter of the screw hole 53a of the fulcrum 53. The outer circumference of the shaft 72b is threaded to engage with the groove of the screw hole 53a.

The two adjusting screws 73 each include a columnar thread 73a and a long shaft 73b. The outer diameter of the thread 73a is larger than the inner diameter of the through holes 67 of the plate 62. The outer diameter of the shaft 73b is smaller than the outer diameter of the thread 73a and the inner diameter of the through holes 67, and approximately equal to the inner diameter of the screw holes 54a of the bosses 54. The outer circumference of the shaft 73b is threaded to engage with the groove of the screw hole 54a. The fixed position of the shaft 73b is adjustable along the z axis by adjusting the amount of the engagement with the groove of the hole 54a.

The coil spring 74 extends furthest when no load is applied and exerts an elastic force against a force to move both ends to be closer to each other. The inner diameter of the coil spring 74 is smaller than the outer diameter of the thread 72a of the fulcrum screw 72 and larger than the inner diameter of the through hole 65 of the concave 64 of the plate 62. The coil spring 74 can be contained in the concave 64.

The two adjusting coil springs 75 extend furthest when no load is applied and exerts an elastic force against a force to move both ends to be closer to each other. The inner diameter thereof is larger than the inner diameter of the through holes 67 of the plate 62 and the outer diameter of the bosses 54 of the mirror support 50.

The angle adjust mechanism 15A is assembled as follows. First, the back surface of the total reflective mirror 15 is placed on the surface 50a of the mirror support 50 so that the four peripheries thereof contact the first protrusion pair 51 and two second protrusion 52, as indicated by the arrow A1 in FIG. 7. Then, the two springs 71 are mounted on the y axis peripheries in a place where the second protrusions 52 are not provided, as indicated by the arrows A2. Thus, the total reflection mirror 15 on the support 50 is fixed at the right position along the x to y plane (FIG. 6).

Then, the back surface 50b of the support 50 on which the total reflection mirror 15 is fixed is set to face the plate 62. And, the shaft 72b of the fulcrum screw 72 is inserted through the coil spring 74 and through hole 65 of the concave 64 of the mount 60 to be secured in the hole 53a of the fulcrum 53 of the mirror support 50, as indicated by the arrow A3. Thus, one end of the coil spring 74 is accommodated in the concave 64 and compressed between the concave 64 and the thread 72a of the fulcrum screw 72 (FIG. 6). By the elastic force of the coil spring 74, the fulcrum 53 of the mirror support 50 engaging with the fulcrum screw 72 is fitted into the seating surface 66 at the end of the through hole 65.

Then, the shafts 73b of the adjusting screws 73 are inserted through the corresponding through holes 67 of the plate 62 and the adjusting coil springs 75 to be secured in the screw holes 54a of the bosses 54, as indicated by the arrows A4. Now, one end of each adjusting coil 75 surrounds the boss 54 and is compressed between the mirror support 50 and the plate 62 of the mount 60. By the elastic force of the adjusting coil springs 75, the threads 73a of the adjusting screws 73 are pressed onto the plate 62 with the shafts 73b fixed in the bosses 54.

Thereby, the total reflection mirror 15 is attached to the mount 60 via the mirror support 50, and the assembly of the angle adjust mechanism 15A is completed. The angle adjust mechanism 15A is placed so that the total reflection mirror 15 is located at the intersection of the first exit axis O1 and the optical axis Oi to reflect the light ray with the wavelength $\lambda A$ from the first light emitter E1 to the optical axis Oi. The plate 61 of the mount 60 is fixed at a certain position inside the light source unit 10.

The fixed position of the angle adjust mechanism 15A is adjustable along the z axis of the adjusting screws 73 by rotating the adjusting screws to adjust the amount of engagement with the holes 54a. Along the rotation of the adjusting screws 73 to +z axis, the threads 73a of the adjusting screws press the vicinity of the through holes 67 of the plate 62 closer to the mirror support 50. Meanwhile, along the rotation of the adjusting screws 73 to −z axis, the threads 73a are moved to −z axis to move the vicinity of the through holes 67 away from the mirror support 50 by the elastic force of the adjusting coil springs 75.

Further, in the angle adjust mechanism 15A the fulcrum 53 of the mirror support 50 is rotatable along the spherical seating surface 66 while pressed onto the seating surface 66 of the through hole 65. The fulcrum 53 or mirror support 50 rotates relative to the seating surface 66 or plate 62 about the center of the spherical surface of the fulcrum 53. Moreover, the center of the angle adjust mechanism 15A matches that of the mirror support 50 and that of the xyz coordinate system and one of the bosses 54 is placed on the x axis while the other is placed on the y axis.

Because of this, in the angle adjust mechanism 15A the total reflection mirror 15 fixed on the support 50 is rotatable around the y axis by rotating the adjusting screw 73 fitted in one of the bosses 54 and the amount of the rotation thereof is adjustable by adjusting the amount of the engagement with the bosses 54. Likewise, the total reflection mirror 15 fixed on the support 50 is rotatable around the x axis by rotating the adjusting screw 73 fitted in the other of the bosses 54 and the amount of the rotation thereof is adjustable. Thus, the angle adjust mechanism 15A can adjust the angle of the total reflection mirror 15.

In the angle adjust mechanism 15A the coil springs 74, 75 provided for the fulcrum screw 72 and adjusting screws 73 can prevent a backlash of the relevant elements due to the screw fastening when attaching the mirror support 50 to the mount 60. Further, owing to the spherical shapes of the fulcrum 53 and seating surface 66, the fulcrum 53 of the mirror support 50 can smoothly rotate relative to the seating surface 66 of the plate 62 and the interference between the mirror support 50 and the mount 60 can be prevented. Further, the through hole 65 and through holes 67 can receive the shaft 72b of the fulcrum screw 72 and the shafts 73b of the adjusting screws 73 with an allowance, respectively, to allow the fulcrum screw 72 and adjusting screws 73 to be inclined in the corresponding through holes. Therefore, the fulcrum screw 72 and adjusting screws 73 do not hinder the rotation of the fulcrum 53 of the mirror support 50 relative to the plate 62 of the mount 60.

Further, the center of the spherical fulcrum 53 can be located at the center of the reflective surface of the total reflection mirror 15 instead of that of the mirror support 50. Thereby, the two rotational axes, x and y axes can be on the reflective surface of the mirror 15 so that the x axis can coincide with one of X and Y axes in FIG. 18 and the y axis can coincide with the other thereof. Setting the centers of the above elements to the intersection between the first exit axis O1 and the optical axis Oi makes it easier to adjust the exit position of the light ray with the wavelength $\lambda A$ by adjusting the angle of the total reflection mirror 15.

The first lighting system 10A comprises the condenser 16, fluorescent wheel 17 having the phosphor 17b, first dichroic mirror 18, and second dichroic mirror 19 on the reflective path of the light ray with the wavelength $\lambda A$ by the reflective and transmissive wheel 14. The condenser 16 includes at least one or more lenses and is disposed ahead of the fluorescent wheel 17 to collect the light ray with the wavelength $\lambda A$ traveling on the reflective path on the micro area 17e (FIG. 8) of the phosphor 17b. The condenser 16 also collects the light ray with the wavelength $\lambda B$ from the phosphor 17b to be incident on the optical elements on the reflective path.

Figure 8:
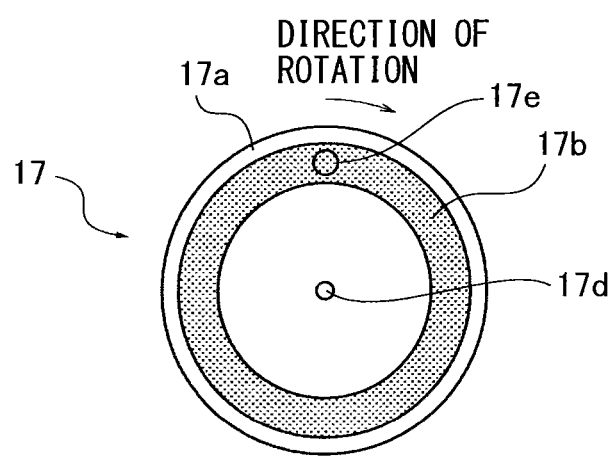
FIG. 8 is a front view of a phosphor 17b of a disc plate 17a of a fluorescent wheel 17.
Figure 9:
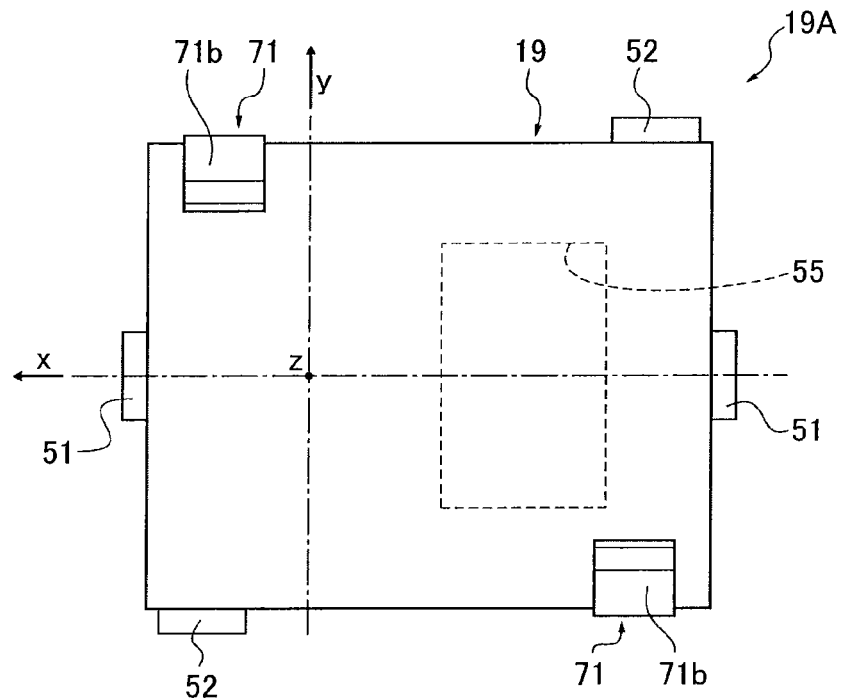
FIG. 9 shows a reflective surface of a second dichroic mirror 19 on a support 50A in an angle adjust mechanism 19A.
Figure 10:
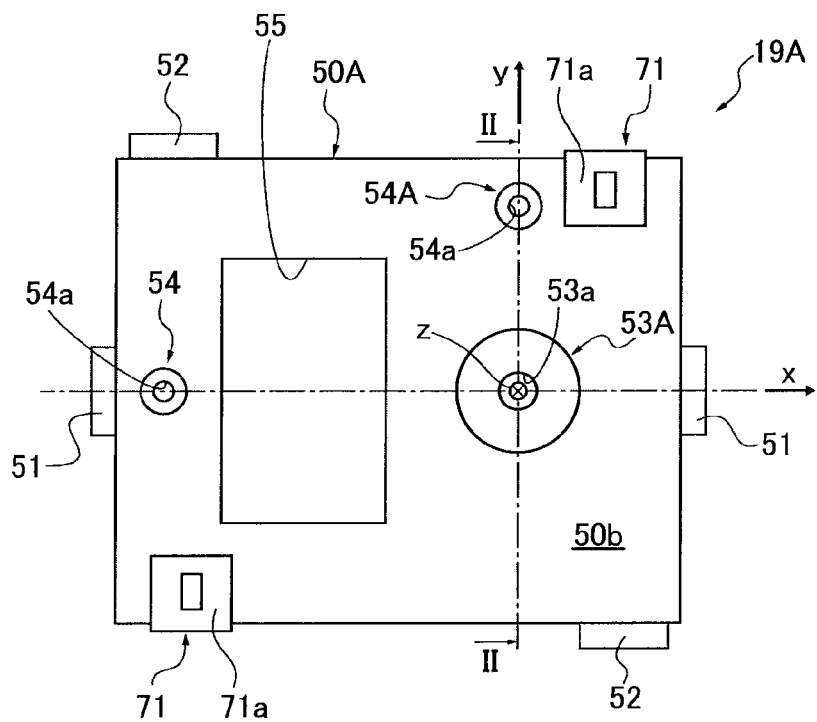
FIG. 10 shows a back surface 50b of the support 50A in FIG. 9 on which a second dichroic mirror 19 is mounted.

The fluorescent wheel 17 in FIG. 8 is comprised of the phosphor 17b and the disc plate 17a on which the phosphor is provided. The disc plate 17a is a reflective element to totally reflect at least the light ray with the wavelength $\lambda B$ from the phosphor 17b. The phosphor 17b is a ring-like element having the center on the axial line of the disc plate 17a. The phosphor 17b receives the light ray with the wavelength $\lambda A$ from the first light emitter E1 and uses it as an excitation light to generate the light ray with the wavelength $\lambda E$. According to the first embodiment the wavelength $\lambda B$ of the fluorescence is 450 nm<$\lambda B$<700 nm. The phosphor 17b thus uses the light ray with the wavelength $\lambda A$ to generate a green fluorescence as illumination.

Referring to FIG. 2, the disc plate 17a of the fluorescent wheel 17 is attached to the rotational shaft 17d of the driver 17c. The driver 17c is connected to the controller 5 and controlled thereby to output a rotational force via the rotational shaft 17d. The rotational shaft 17d extends along the axial line of the disc plate 17a so that together with the driving of the driver 17c, the disc plate 17a is rotated around the rotational shaft 17d. The disc plate 17a is provided to allow, irrespective of its rotation about the rotational shaft 17d, the micro area 17e of the phosphor 17b to be at the position where the condenser 16 collects the traveling light ray with the wavelength $\lambda A$.

The first dichroic mirror 18 is provided between the condenser 16 and the reflective and transmissive wheel 14 on the reflective path, to transmit the light ray with the wavelength $\lambda A$ therethrough and reflect the light ray with the wavelength $\lambda B$. It is positioned to reflect the light ray with the wavelength $\lambda B$ from the condenser 16 to the second dichroic mirror 19.

The second dichroic mirror 19 is provided between the total reflection mirror 15 and a third dichroic mirror 22 of a later-described second lighting system 10B on the optical axis Oi. It transmits the light ray with the wavelength $\lambda A$ therethrough and reflects the light ray with the wavelength $\lambda B$ from the first dichroic mirror 18 to the optical axis Oi. The second dichroic mirror 19 is a second reflective element to reflect the light ray from the second light emitter E2.

On the reflective path of the first lighting system 10A the light ray with the wavelength $\lambda A$ from the first light emitter E1 is reflected by the reflective area 14p of the reflective and transmissive wheel 14, transmits through the first dichroic mirror 18, is collected by the condenser 16, and illuminates the micro area 17e of the phosphor 7b of the fluorescent wheel 17. The illuminated micro area 17e is excited and generates the light ray with the wavelength $\lambda B$, which directly travels to the condenser 16 or is reflected by the disc plate 17a to the condenser 16. A part of the light ray with the wavelength λA is not absorbed by the micro area 17e of the phosphor 17b and travels to the condenser 16. Then, these light rays collected by the condenser 16 travel to the first dichroic mirror 18.

The first dichroic mirror 18 then reflects the light ray with the wavelength λB to the second dichroic mirror 19 and transmits the light ray with the wavelength λA therethrough. The second dichroic mirror 19 reflects the light ray with the wavelength λB from the first dichroic mirror 18 to the optical axis Oi. Thus, on the reflective path of the first lighting system 10A the light ray with the wavelength λB is guided to the optical axis Oi and the light ray with the wavelength λA as excitation light is prevented from traveling to the optical axis Oi.

Thus, the phosphor 17b and the condenser 16 form a second light emitter E2 to emit the light ray with the wavelength λB. The condenser 16 couples the light ray with the wavelength λB from the phosphor 17b. The phosphor 17b works as a second light source and the condenser 16 works as a second coupling lens. The second light emitter E2 projects the light ray coupled by the condenser 16 on a second exit axis O2 which is returned by the first dichroic mirror 18 to the second dichroic mirror 19. The second dichroic mirror 19 is an optical path combiner to converge the light ray with the wavelength λB having passed through the first dichroic mirror 18 on the second exit axis O2. That is, it joins a later-described second exit path P2 into a common optical path of the lighting path Pi on which the three color light rays propagate.

Figure 11:
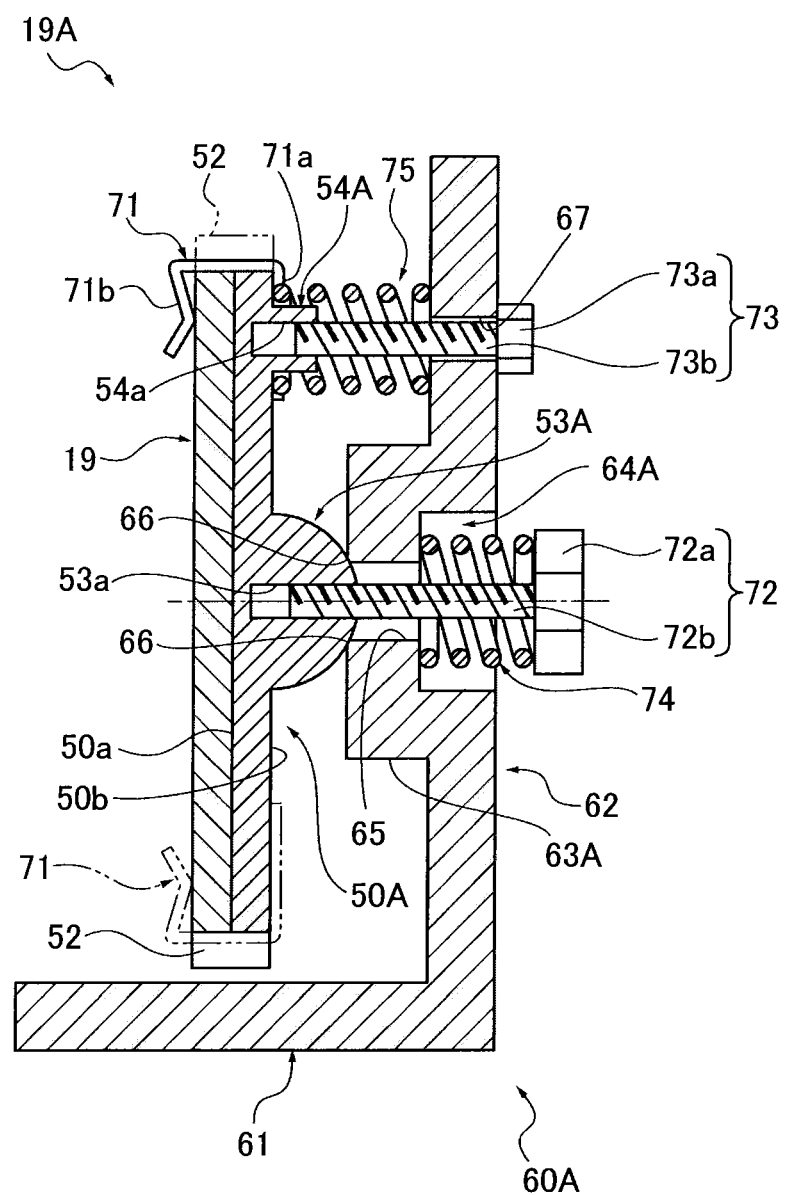
FIG. 11 is a cross section view of the angle adjust mechanism 19A in which the second dichroic mirror 19 is placed on a mount 60A via the support 50A along the II to II line in FIG. 10.
Figure 12:
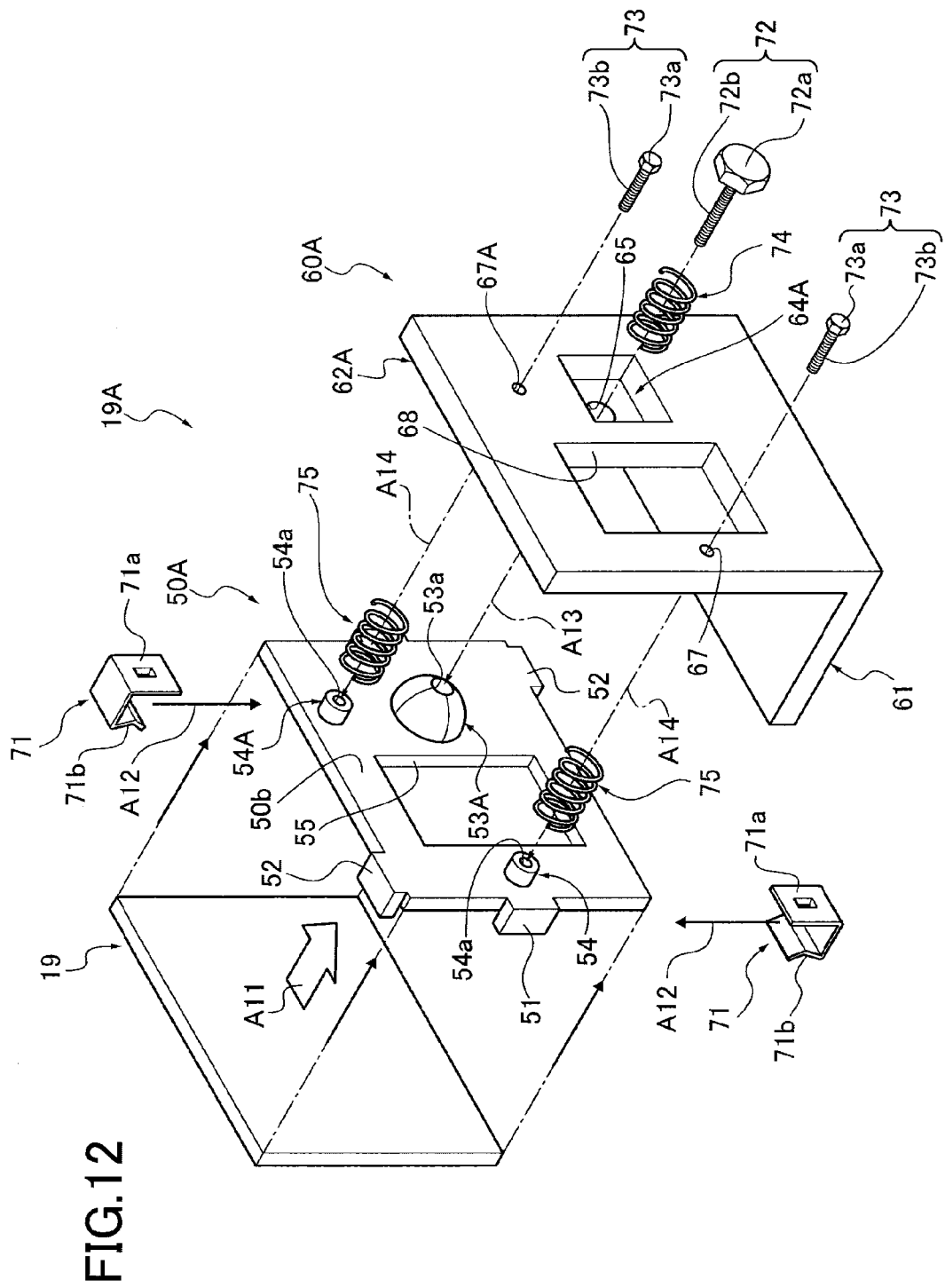
FIG. 12 is a perspective, exploded view of the structure of the angle adjust mechanism 19A.

Referring to FIG. 9 to FIG. 12 the second dichroic mirror 19 according to the first embodiment is a plate including a rectangular reflective surface and the angle thereof is adjustable by the angle adjust mechanism 19A in FIGS. 11, 12. The structure of the angle adjust mechanism 19A is similar to that of the angle adjust mechanism 15A adjusting the angle of the total reflection mirror 15 so that the same and like parts are given the same reference numbers and a detailed description thereof is omitted. In the angle adjust mechanism 19A the second dichroic mirror 19 is placed on a mount 60A via a mirror support 50A.

The support 50A is basically the same as the mirror support 50 of the angle adjust mechanism 15A except for a window 55. The window 55 is intended to transmit therethrough the light ray with the wavelength λA emitted from the first light emitter E1 and guided by the transmissive path onto the optical axis Oi. The window 55 is formed on a left side of the mirror support 50 in FIG. 10 by cutting out a part of the support 50A. Alternatively, it can be made from an optical transmissive material including a glass through which the light ray with the wavelength λA transmits. The support 50A can be made from an optical transmissive material and in this case the window 55 is omissible. However, it is preferable to select the elements or adjust the positions of the elements when needed, with a change in the traveling direction of the light ray with the wavelength λA due to a refraction based on an incidence angle.

Because of the window 55 the positions of a fulcrum 53A and the other boss 54A are different from those of the mirror support 50. The fulcrum 53A is provided on the opposite side of the window 55 on the x axis (right side in FIG. 10) to avoid the window 55. The other boss 54A is at the same position on the x axis as the fulcrum 53A and provided near the peripheral of the back surface 50b of the support 50A. The position of the boss 54A is moved from that of the mirror support 50 by an amount equal to a displacement amount of the fulcrum 53A on the x axis.

In the support 50A or angle adjust mechanism 19A the position of the fulcrum 53A and the other boss 54A on the x axis is defined to be y axis. Thus, the intersection of the x and y axes is on the axial line of a screw hole 53a of the fulcrum 53A, and the y axis is displaced towards the x axis from that of the mirror support 50.

A mount 60A is different from the mount 60 of the angle adjust mechanism 15A in including a window 68 in a plate 62A in FIG. 12. Similar to the window 55, the window 68 is intended to transmit therethrough the light ray with the wavelength λA emitted from the first light emitter E1 and guided by the transmissive path onto the optical axis Oi. The window 68 is formed on a left side of the mount 60 in FIG. 12 by cutting out a part of the mount 60A, to face the window 55 on the z axis when the support 50A is attached to the mount 60A. Alternatively, the window 68 can be made from an optical transmissive material including a glass through which the light ray with the wavelength λA transmits. The plate 62A or mount 60A can be made from an optical transmissive material and in this case the window 68 is omissible. However, it is preferable to select the elements or adjust the positions of the elements when needed, with a change in the traveling direction of the light ray with the wavelength λA due to a refraction based on an incidence angle.

Because of the window 68 the positions of the convexity 63A and the other through hole 67A are different from those of the mount 60. The convexity 63A is provided on the opposite side of the window 68 on the x axis (right side in FIG. 12) to avoid the window 68. The other through hole 67A is at the same position on the x axis as the convexity 63A and provided near the peripheral of the plate 62A. The position of the other through hole 67A is moved from that of the mount 60 by an amount equal to a displacement amount of the convexity 63A on the x axis.

The angle adjust mechanism 19A is assembled as follows. First, referring to FIG. 12, the back surface of the second dichroic mirror 19 is placed on the surface 50a (FIG. 11) of the support 50A and the pair of first protrusions 51 or two second protrusions 52 are placed on the peripheries of the second dichroic mirror 19, as indicated by the arrow A11. Then, the two springs 71 are attached on the y axis peripheries, avoiding the positions of the second protrusions 52, as indicated by the arrows A12. Thereby, the second dichroic mirror 19 is properly fixed on the support 50A along the x to y plane. With the window 55 of the support 50A, the second dichroic mirror 19 attached to the surface 50a of the support 50A can transmit the light ray with the wavelength λA traveling from the back surface 50b through the window 55.

Then, while the back surface 50b of the support 50A is placed to face the plate 62A, the shaft 72b of the fulcrum screw 72 is inserted into the coil spring 74, the through hole 65 of the concave 64A of the mount 60 and the screw hole 53a of the fulcrum 53A of the support 50A, as indicated by the arrow A13. One end of the coil spring 74 is contained in the concave 64A and compressed between the concave 64A and the thread 72a of the fulcrum screw 72 in FIG. 11. By the elastic force of the coil spring 74, the fulcrum 53A into which the screw 72 is inserted is fitted into the seating surface 66 at one end of the through hole 65.

Also, the shafts 73b of the adjusting screws 73 are inserted into the through holes 67 of the plate 62A, coil springs 75, and screw holes 54a of the bosses 54 of the support 50A, as indicated by the arrows A14. Then, while surrounding the bosses 54 at one ends, the coil springs 75 are compressed between the support 50A and the plate 62A of the mount 60A. By the elastic force of the coil springs 75, the thread 73a of each adjusting screw 73 is pressed onto the vicinity of the through hole 67 of the plate 62A.

Thereby, the second dichroic mirror 19 is attached to the mount 60A via the support 50A, completing the assembly of the angle adjust mechanism 19A. The angle adjust mechanism 19A is installed so that the second dichroic mirror 19 is located at the intersection of the second exit axis O2 and the optical axis Oi to reflect the light ray with the wavelength λB from the second light emitter E2 to the optical axis Oi. The optical axis Oi is located inside the window 55 of the support 50A and the window 68 of the plate 62A. The angle adjust mechanism 19A is secured in the light source unit 10 by fixing the plate 61 of the mount 60A at a certain position thereof. Thus, the light ray with the wavelength λA from the first light emitter E1 guided to the optical axis Oi by the transmissive path of the first lighting system 10A passes through the windows 68, 55 and reaches the second dichroic mirror 19.

Similar to the angle adjust mechanism 15A, the support 50A or second dichroic mirror 19 can be rotated about the y axis by rotating the adjusting screws 73 fitted into both of the bosses 54. Further, the rotational amount of the second dichroic mirror 19 is adjustable by adjusting the amount of the engagement of the adjusting screws 73 with the bosses 54. Thus, the angle adjust mechanism 19A can adjust the angle of the second dichroic mirror 19.

The angle adjust mechanism 19A can attain the same effects as those of the angle adjust mechanism 15A. In addition, with the windows 55, 68 facing each other on the z axis, the light ray with the wavelength λA traveling from the back side of the plate 62A can reach the second dichroic mirror 19 through the windows 68, 55. Besides, the optical axis Oi is located inside the windows 68, 55. Thereby, in the angle adjust mechanism 19A the second dichroic mirror 19 can reflect the light ray with the wavelength λB from the second light emitter E2 to the optical axis Oi as well as transmit the light ray with the wavelength λA from the first light emitter E1 therethrough to travel on the optical axis Oi.

Note that the angle adjust mechanism 19A can use the first dichroic mirror 18 instead of the second dichroic mirror 19 or both of the dichroic mirrors 18, 19.

In the first lighting system 10A the light ray with the wavelength λA can be the illumination or excitation light from behind the first coupling lens 13 of the first light emitter E1 to the reflective and transmissive wheel 14 on the first exit axis O1. Further, only the light ray with the wavelength λA propagates from the reflective and transmissive wheel 14 to the second dichroic mirror 19 via the total reflection mirror 15. The light ray with the wavelength λB from the phosphor 17b and the excitation light (with the wavelength λA) from the first light emitter E1 propagate from the phosphor 17b to the first dichroic mirror 18 via the condenser 16. Further, only the light ray with the wavelength λB propagates from the first dichroic mirror 18 to the second dichroic mirror 19.

In the first lighting system 10A the path from the reflective and transmissive wheel 14 to the second dichroic mirror 19 via the total reflection mirror 15 is a first exit path P1 through which the light ray with the wavelength λA is guided to the optical axis Oi. An optical element 31 comprised of a lens is provided on the first exit path P1 to collect the light ray with the wavelength λA and allow it to be incident on the light tunnel 6 of the optical guide 2 on the optical axis Oi. Also, the path from the first dichroic mirror 18 to the second dichroic mirror 19 is a second exit path P2 through which the light ray with the wavelength λB from the second light emitter E2 is guided to the optical axis Oi. Another optical element 32 comprised of a lens is provided on the second exit path P2 to collect the light ray with the wavelength λB and allow it to be incident on the light tunnel 6 of the optical guide 2 on the optical axis Oi. The reflective and transmissive wheel 14 as an optical path switch is configured to split the light ray with the wavelength λA into the reflective path for the excitation of the phosphor 17b and the transmissive path for irradiating the screen Sc.

As shown in FIG. 8, the micro area 17e of the phosphor 17b of the fluorescent wheel 17 is illuminated with the light ray with the wavelength λA in spot-like form. If the micro area 17e remains at the same position and the spot-like light continuously illuminates this position, fluorescence generation efficiency and light emitting property of the phosphor 17b may deteriorate. In view of this, the disc plate 17a of the fluorescent wheel 17 is continuously rotated about the rotational shaft 17d to temporally change the position of the micro area 17e or the illuminated area in spot-like form. It is thus able to prevent the energy of the light ray with the wavelength λA from concentrating on the same area, resulting in avoiding a decrease in the fluorescence generation efficiency or light emitting property of the phosphor 17b. In addition, the reflective and transmissive wheel 14 is provided to alternatively switch, in unit time of second, the traveling direction of the light ray with the wavelength λA from the fluorescent wheel 17 between the transmissive and reflective paths of the first lighting system 10A. Because of this, the light source unit 10 can shorten the length of time for which the phosphor 17b is illuminated with the light ray with the wavelength λA as excitation light. Thereby, the decrease in the fluorescence generation efficiency or light emitting property of the phosphor 17b can be effectively prevented.

The structure of the fluorescent wheel 17 can be arbitrarily configured as long as it can temporally change the position of the micro area 17e or the illuminated area with the spot-like light ray with the wavelength λA. For example, in place of the disc plate 17a, a long plate including the phosphor 17b extending along the length thereof can be reciprocatively moved along the length.

The second lighting system 10B in FIG. 2 comprises the light source 12 as a third light source, a third coupling lens 21 and a third dichroic mirror 22. The third coupling lens 21 is made of at least one or more lenses to collect a light ray with the wavelength λC from the light source 12 to be incident on the optical elements of the second lighting system 10B. The third coupling lens 21 and the light source 12 form a third light emitter E3 to project the light ray with the wavelength λC. The third coupling lens 21 couples the light ray with the wavelength λC for projection on a third exit axis O3. Thus, the light ray with the wavelength λC from the light source 12 is collected by the third coupling lens 21 and travels on the third exit axis O3 on which the third dichroic mirror 22 is provided.

The third dichroic mirror 22 is configured to transmit the light rays with the wavelengths λA, λB therethrough and reflect the light ray with the wavelength λC. It is disposed on the opposite side of the total reflection mirror 15, that is, behind the total reflection mirror 15 (first exit path P1) and the second dichroic mirror 19 (second exit path P2) on the optical axis Oi in a light traveling direction. It is located at the intersection of the third exit axis O3 and the optical axis Oi to reflect the light ray with the wavelength λC from the third light emitter E3 to the optical axis Oi. It works as a third reflective element. Thus, in the second lighting system 10B the light ray with the wavelength λC from the third light emitter E3 is reflected by the third dichroic mirror 22 to the optical axis and propagates thereon.

The second lighting system 10B functions as a third exit path P3 for guiding the light ray with the wavelength λC from the third light emitter E3 to the optical axis Oi. The third dichroic mirror 22 is an optical path combiner to converge the light ray with the wavelength λC from the third light emitter on the optical axis Oi. That is, it joins the third exit path P3 into a common optical path of the lighting path Pi on which the three color light rays propagate.

According to the first embodiment the third dichroic mirror 22 includes a rectangular reflective surface and the angle thereof is adjustable by an angle adjust system similar to that 19A in FIG. 9 to FIG. 12. That is, the angle adjust system supports the third dichroic mirror 22 instead of the second dichroic mirror 19 to change the angle thereof. This angle adjust system is installed in the light source unit 10 by fixing a plate 61 of the mount 60A at a certain position therein so that the third dichroic mirror 22 is properly positioned.

As described above, according to the light source unit 10 the transmissive path of the first lighting system 10A can guide the light ray with the wavelength λA from the first light emitter E1 to the optical axis Oi. The second and third dichroic mirrors 19, 22 are provided on the optical axis Oi to transmit the light ray with the wavelength λA therethrough, in other words, exert no optical effects on the light ray with the wavelength λA traveling through the transmissive path on the optical axis Oi.

Further, according to the light source unit 10 the reflective path of the first lighting system 10A can guide the light ray with the wavelength λB from the second light emitter E2 to the optical axis Oi. The third dichroic mirror 22 on the optical axis Oi is configured to transmit the light ray with the wavelength λB therethrough, in other words, exert no optical effects on the light ray with the wavelength λB traveling through the reflective path on the optical axis Oi.

Further, the second lighting system 10B can guide the light ray with the wavelength λC from the third light emitter E3 to the optical axis Oi.

Thus, the light source unit 10 can guide and emit the light rays with the wavelengths λA, λB, λC onto the single optical axis Oi. The optical axis Oi is the exit axis of these light rays from the common path of the lighting path Pi. According to the light source unit 10 in the first embodiment, the optical axis Oi of the lighting path Pi matches the axial line of the light tunnel 6 of the optical guide 2 (FIG. 1) so that the light rays with the wavelengths λA, λB, λC can be incident on the light tunnel 6.

The controller 5 of the light source unit 10 can control the rotation of the reflective and transmissive wheel 14 and the turning-on of the light source 11 in accordance with the rotational position of the reflective and transmissive wheel 14, that is, presence of the reflective area 14p or the transmissive area 14q on the first exit axis O1. In the light source unit 10 the light ray with the wavelength λA travels on either the transmissive path or reflective path according to the color of image data. The reflective and transmissive wheel 14 is configured to rotate 120 times per second or once in one frame (1/120 sec., for example). The controller 5 controls the first lighting system 10A and the turning-on of the light source 12 in accordance with the color of image data. Thus, the controller 5 controls the light source unit 10 to emit the light rays with the wavelengths λA, λB, λC as illumination in order on the optical axis Oi in synchronization with image data or the driving of the imaging unit 3.

Further, the light source unit 10 can emit magenta (M) light by additive color mixing by emitting together the light rays with the wavelength λA, λC from the transmissive path of the first lighting systems 10A and the second lighting system 10B on the optical axis Oi. Likewise, it can emit yellow (Y) light by emitting together the light rays with the wavelengths λB, λC from the reflective path of the first lighting systems 10A and the second lighting system 10B on the optical axis Oi. It can be thus configured to arbitrarily use the light rays with the wavelengths λA, λB, λC.

According to the projector in FIG. 1 the light rays with the wavelengths λA, λB, λC from the light source unit 10 are guided in order to the light tunnel 6 of the optical guide 2 to be with even luminance and illuminate the imaging unit 3. The projector 1 projects three color images generated by the imaging unit 3 from the projection system 4 in order onto the screen Sc and form a full color image based on the image data on the screen Sc.

Figure 13:
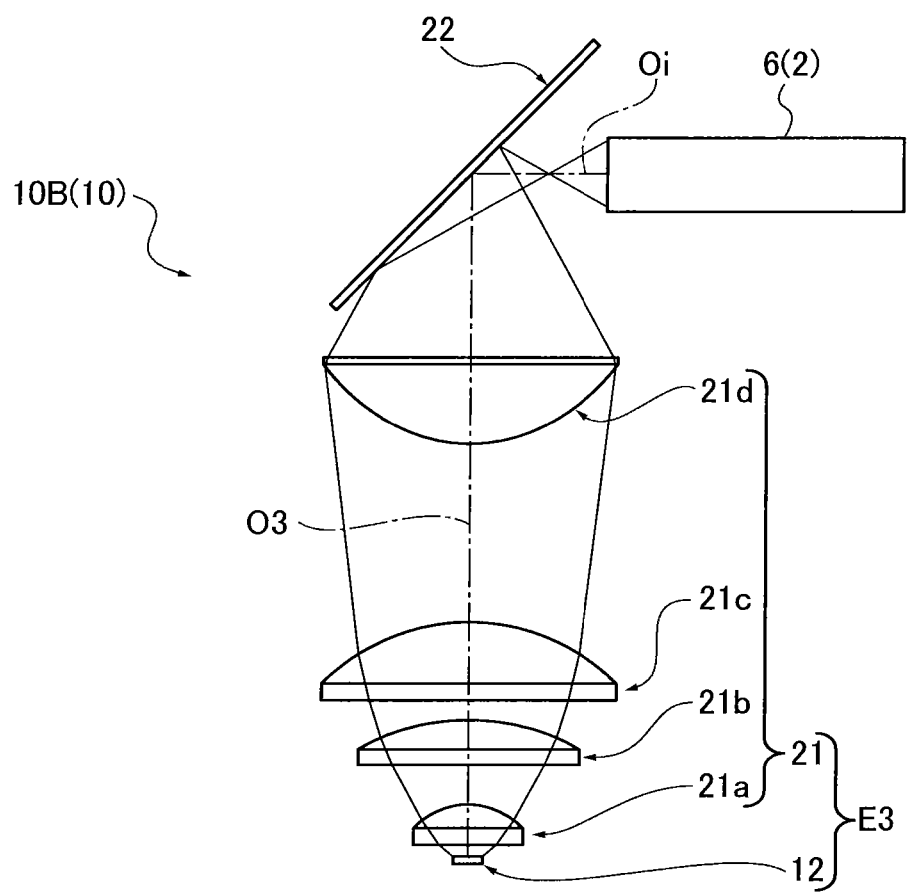
FIG. 13 shows the structure of a second lighting system 10B of the light source unit 10 by way of example.

Next, an example of the structure of the second lighting system 10B of the light source unit 10 is described referring to FIG. 13. For better understanding only the second lighting system 10B and its light rays are shown and the light tunnel 6 of the optical guide 2 is aligned with the optical axis Oi of the lighting path in the drawing.

The second lighting system 10B comprises the light source 12, third coupling lens 21, and third dichroic mirror 22. The light source 12 is a red light emitting diode (LED) to emit the light ray with the wavelength λ in approximate Lambert distribution. The third coupling lens 21 is designed with the distribution of the light ray with the wavelength λC from the light source 12 taken into account.

The third coupling lens 21 according to the first embodiment comprises four plane-convex lenses 21a, 21b, 21c, 21d aligned on the third exit axis O3. The lenses 21a, 21b, 21c each includes a convex surface to the third dichroic mirror 22 side and the lens 22 includes a convex surface to the light source 12 side, facing the lens 21c. The third coupling lens 21 collects the light ray with the wavelength λC from the light source 12 to be incident on the third dichroic mirror 22 and the light tunnel 6 of the optical guide 2. The four lenses 21a, 21b, 21c, 21d of the third coupling lens 21 and the light source 12 form a third light emitter E3 to emit the light with the wavelength λC.

As described above, the third dichroic mirror 22 is located at the intersection of the third exit axis O3 and the optical axis Oi to reflect the light ray with the wavelength λC from the third light emitter E3 to the optical axis Oi. The axial line of the light tunnel 6 of the optical guide 2 matches the optical axis Oi of the lighting path Pi so that the light rays with the wavelengths λA, λB, λC can be emitted to the light tunnel 6.

Now, a problem in a light source unit in related art emitting different color lights is described. Japanese Patent Application Publication No. 2011-95388, for example, discloses a light source unit which comprises a first light emitter including a phosphor to emit a light ray in a green wavelength band, a second light emitter including an LED to emit a light ray in a red wavelength band, and a third light emitter to emit a light ray in a blue wavelength band. The first light emitter uses a blue laser diode as an excitation light source and emits a laser beam to the phosphor to excite it and generate a light ray in a green wavelength band from a fluorescence from the phosphor. The three light emitters each include a condensing lens group to collect the light rays from the phosphor and LEDs for projection. The light source unit converges the color light rays from the three light emitters on a single optical axis and projects red, green, and blue light rays on the optical axis.

However, in the above light source unit the optical elements are provided on the optical axis to exert optical effects on all the three traveling color light rays and it cannot adjust the positions of the light rays individually. For example, by changing the angle or position of the second dichroic mirror to make the light in a red wavelength band from the second light emitter incident on the condensing lenses, the incidence positions of not only the light in a red wavelength band but also the light in a green wavelength band are changed. Since the exit positions of the lights from the light emitters cannot be adjusted separately, the light source unit cannot illuminate a proper position due to a tolerance in the optical elements of the light source unit and may not realize designed illumination efficiency.

Meanwhile, each of the light emitters of the above light source unit comprises the light source as phosphor or LED and the condensing lens group. The light emitters can adjust the positions of the condensing lens groups relative to the light sources to adjust the positions of the three color lights individually. However, for this purpose it is necessary to move the condensing lens groups in a direction orthogonal to the optical axes of the light emitters. Moreover, the size of the condensing lens groups has to be large enough to couple the lights from the light sources in the moved positions. This accordingly brings an increase in the size of the condensing lenses in the direction orthogonal to the optical axis and the size of the light source unit or projector incorporating the light source unit.

Furthermore, the second and third light sources of this light source unit are LEDs, and the light in a red wavelength band from the second light source passes through plural optical elements. Because of this, a sufficient amount of light cannot be obtained. By use of a laser diode array, the light amount can be easily increased with no increase in the size of the light source unit. However, arranging a number of LEDs having a large light emitting area may degrade emission efficiency and leads to an increase in the size of an optical system to combine the lights from the LEDs.

Meanwhile, the light source unit 10 according to the first embodiment can change the exit position of the light ray with the wavelength λA from the first light emitter E1 by changing the angle or position of the total reflection mirror 15 reflecting the light ray with the wavelength λA from the first light emitter E1. The light rays with the wavelengths λB, λC from the second and third light emitters E2, E3 are not incident on the total reflection mirror 15 so that a change in the angle or the position thereof does not affect the exit positions of the light rays with the wavelengths λB, λC. Thus, the light source unit 10 can individually adjust the exit position of the light ray with the wavelength λA by changing the angle or position of the total reflection mirror 15. The total reflection mirror 15 is a first optical adjuster.

Further, the light source unit 10 can change the exit position of the light ray with the wavelength λA from the first light emitter E1 by changing the position of the optical element 31 through which the light ray with the wavelength λA transmits. The light rays with the wavelengths λB from the second and third light emitters E2 are not incident on the optical element 31 so that a change in the position thereof does not affect the exit positions of the light rays with the wavelengths λB, λC. Thus, the light source unit 10 can individually adjust the exit position of the light ray with the wavelength λA by changing the position of the optical element 31. The optical element 31 is a first optical adjuster.

Further, the light source unit 10 can change the exit position of the light ray with the wavelength λB from the second light emitter E2 by changing the angle or position of the first or second dichroic mirror 18, 19 both of which reflect the light ray with the wavelength λB from the second light emitter E2 and transmit the light ray with the wavelength λA from the first light emitter therethrough. The light ray with the wavelength λC from the third light emitter E3 is not incident on the first and second dichroic mirrors 18, 19. Therefore, a change in the angle or position of the first or second dichroic mirror 18, 19 does not affect the exit positions of the light rays with the wavelengths λA, λC. Thus, the light source unit 10 can individually adjust the exit position of the light ray with the wavelength λB by changing the angle or position of the first or second dichroic mirrors 18, 19. The first and second dichroic mirrors 18, 19 are second optical adjusters.

Further, the light source unit 10 can change the exit position of the light ray with the wavelength λB from the second light emitter E2 by changing the position of the optical element 32 through which the light ray with the wavelength λB transmits. The light rays with the wavelengths λA, λC from the first and third light emitters E2, E3 are not incident on the optical element 32 so that a change in the position thereof does not affect the exit positions of the light rays with the wavelengths λA, λC. Thus, the light source unit 10 can individually adjust the exit position of the light ray with the wavelength λB by changing the position of the optical element 32. The optical element 32 is a second optical adjuster.

Furthermore, the light source unit 10 can change the exit position of the light ray with the wavelength λC from the third light emitter E3 by changing the angle or position of the third dichroic mirror 22 which reflects the light ray with the wavelength λC from the third light emitter E3 and transmits the light rays with the wavelengths λA, λB from the first and second light emitters E1, E2 therethrough. Therefore, a change in the angle or position of the third dichroic mirror 22 does not affect the exit positions of the light rays with the wavelengths λA, λC. Thus, the light source unit 10 can individually adjust the exit position of the light ray with the wavelength λC by changing the angle or position of the third dichroic mirrors 22. The third dichroic mirror 22 is a third optical adjuster.

The first optical adjuster, total reflection mirror 15 or optical element 31 is provided on the first exit path P1 through which the light ray with the wavelength λA from the first light emitter E1 is guided to the optical axis Oi. The first exit path is provided to transmit only the light ray with the wavelength λA therethrough for joining it on the common optical path of the lighting path Pi on which the three color lights propagate. It is easy to provide the first optical adjuster in the light source unit 10 so as not to exert optical effects on the traveling direction of the light rays with the wavelengths λB, λC.

The second optical adjuster, first or second dichroic mirror 18, 19 or optical element 32 is provided on the second exit path P2 through which the light ray with the wavelength λB from the second light emitter E2 is guided to the optical axis Oi. The second exit path P2 is provided to transmit only the light ray with the wavelength λB therethrough for joining it on the common optical path of the lighting path Pi on which the three color lights propagate. It is easy to provide the second optical adjuster in the light source unit 10 so as not to exert optical effects on the traveling direction of the light rays with the wavelengths λA, λC.

The third optical adjuster or third dichroic mirror 22 is provided on the third exit path P3 through which the light ray with the wavelength λC from the third light emitter E3 is guided to the optical axis Oi. The third exit path P3 is provided to transmit only the light ray with the wavelength λC therethrough for joining it on the common optical path of the lighting path Pi on which the three color lights propagate. It is easy to provide the third optical adjuster in the light source unit 10 so as not to exert optical effects on the traveling direction of the light rays with the wavelengths λA, λB.

The light source unit 10 uses the total reflection mirror 15 as a first optical adjuster to join the first exit path P1 into the common optical path of the lighting path Pi on which the three color lights propagate. The light source unit 10 can individually adjust the position of the light ray with the wavelength $\lambda A$ from the first light emitter E1 relative to the optical axis Oi by changing the angle or position of the total reflection mirror 15 relative to the optical axis Oi. The light source unit 10 can easily adjust the exit position of the light ray with the wavelength $\lambda A$ from the first light emitter E1.

In the light source unit 10 the amount of the rotation or angle of the total reflection mirror 15 about the x and y axes along the x to y plane can be adjusted by the angle adjust mechanism 15A. The total reflection mirror 15 also works as an optical path combiner to reflect the light ray with the wavelength $\lambda A$ to the optical axis Oi. Thus, the exit position of the light ray with the wavelength $\lambda A$ from the first light emitter E1 can be changed by not changing the position of the total reflection mirror 15 but adjusting the angle thereof. The light source unit 10 can easily and properly adjust the exit position of the light ray with the wavelength $\lambda A$ from the first light emitter E1 by changing the angle of the total reflection mirror 15 so that the light ray with the wavelength $\lambda A$ travels on the optical axis Oi without any changes in the exit positions of the light rays with the wavelengths $\lambda B$, $\lambda C$.

Further, since the angle of the total reflection mirror 15 is adjustable by the angle adjust mechanism 15A, it is able to avoid an increase in the size of the light source unit 10 unlike the structure that the condensing lens groups of the light emitters are movable in directions orthogonal to the optical axes.

The light source unit 10 comprises the second dichroic mirror 19 as a second optical adjuster on the optical axis Oi which converges the second exit path P2 on the common optical path. By changing the angle or position of the second dichroic mirror 19 relative to the optical axis Oi, the position of the light ray with the wavelength $\lambda B$ from the second light emitter E2 can be individually adjusted. The light source unit 10 can easily adjust the exit position of the light ray with the wavelength $\lambda B$.

Further, the amount of the rotation of the second dichroic mirror 19 about the x and y axes on the x to y plane can be adjusted by the angle adjust mechanism 19A. Therefore, the exit position of the light ray with the wavelength $\lambda B$ from the second light emitter E2 can be changed by not changing the position of the second dichroic mirror 19 but adjusting the angle thereof. Also, the second dichroic mirror 19 reflects the light ray with the wavelength $\lambda B$ to the optical axis Oi. The exit position of the light ray with the wavelength $\lambda B$ can be easily adjusted by simply changing the angle of the second dichroic mirror 19 so that the light ray with the wavelength $\lambda B$ travels on the optical axis Oi. The light source unit 10 can easily and properly adjust the exit position of the light ray with the wavelength $\lambda B$ from the second light emitter E2 without any changes in the exit positions of the light rays with the wavelengths $\lambda A$, $\lambda C$. Also, by use of the first dichroic mirror 18 in the angle adjust mechanism 19A, the same effects can be achieved by easily adjusting the angle thereof.

Further, the angle of the second dichroic mirror 19 is adjustable by the angle adjust mechanism 19A. This contributes to avoiding an increase in the size of the light source unit 10 unlike the structure that the condensing lens groups of the light emitters are movable in directions orthogonal to the optical axes. Also, by use of the first dichroic mirror 18 in the angle adjust mechanism 19A, the same effects can be achieved by easily adjusting the angle thereof.

The light source unit 10 uses the third dichroic mirror 22 as a second optical adjuster to converge the third exit path P3 on the common optical path of the lighting path Pi on which the three color lights propagate. Therefore, the light source unit 10 can individually adjust the position of the light ray with the wavelength $\lambda C$ from the third light emitter E3 relative to the optical axis Oi by changing the angle or position of the third dichroic mirror 22 relative to the optical axis Oi. The light source unit 10 can easily adjust the exit position of the light ray with the wavelength $\lambda C$ from the third light emitter E3.

In the light source unit 10 the amount of the rotation or angle of the third dichroic mirror 22 about the x and y axes along the x to y plane can be adjusted by the angle adjust mechanism 19A. The third dichroic mirror 22 also works as an optical path combiner to reflect the light ray with the wavelength $\lambda C$ to the optical axis Oi. Thus, the exit position of the light ray with the wavelength $\lambda C$ from the third light emitter E3 can be changed by not changing the position of the third dichroic mirror 22 but adjusting the angle thereof. The light source unit 10 can easily and properly adjust the exit position of the light ray with the wavelength $\lambda C$ from the third light emitter E3 by changing the angle of the third dichroic mirror 22 so that the light ray with the wavelength $\lambda C$ travels on the optical axis Oi without any changes in the exit positions of the light rays with the wavelengths $\lambda A$, $\lambda B$.

Further, the angle of the third dichroic mirror 22 is adjustable by the angle adjust mechanism 19A. This contributes to avoiding an increase in the size of the light source unit 10 unlike the structure that the condensing lens groups of the light emitters are movable in directions orthogonal to the optical axes.

By use of the optical element 31 on the first exit path P1, the light source unit 10 with a simple structure can individually adjust the exit position of the light ray with the wavelength $\lambda A$ from the first light emitter E1.

By use of the optical element 32 on the second exit path P2, the light source unit 10 with a simple structure can individually adjust the exit position of the light ray with the wavelength $\lambda B$ from the second light emitter E2.

Moreover, the light source unit 10 uses a blue laser diode as the light source 11, a red LED as the light source 12, and the phosphor 17b to generate the fluorescence with the wavelength $\lambda B$ from the light ray with wavelength $\lambda A$ from the light source 11. Thus, the light source unit 10 can emit three color lights in different wavelength bands from the two light sources 11, 12.

The light source unit 10 uses a blue laser diode as both the light source 11 and the excitation source for the phosphor 17b. A laser diode array can easily increase the amount of light emission without an increase in the size. Thus, the light source unit 10 can emit a sufficient amount of the light rays with the wavelengths $\lambda A$, $\lambda B$ as illumination without an increase in the size thereof.

The light source unit uses the reflective and transmissive wheel 14 as an optical path switch to alternatively switch, in unit of second, the path of the light ray with the wavelength $\lambda A$ between the reflective path for the excitation of the phosphor 17b and the transmissive path for illuminating the screen Sc. Therefore, it can change the usage rate of the light ray with the wavelength $\lambda A$ for the illumination and excitation light in accordance with the switch rate of the reflective and transmissive wheel 14. Further, it can emit a sufficient amount of the light rays with the wavelength $\lambda A$, $\lambda B$ in a balanced manner by properly adjusting the light amount of the light source 11 and the switch rate of the reflective and transmissive wheel 14.

Further, the third dichroic mirror 22 is placed behind the total reflection mirror 15 (first exit path P1) and second dichroic mirror 19 (second exit path P2) in a light traveling direction on the optical axis Oi. That is, the third exit path P3 is placed closest to the exit. Because of this, the optical path length of the light ray with the wavelength $\lambda C$ from the third light emitter E3 can be shortened as well as the number of optical elements through which the light ray with the wavelength λC transmits can be reduced. Thus, by use of the LED for the light source 12, the light source unit 10 can emit a sufficient amount of the light ray with the wavelength λC from the third light emitter E3.

Further, the third dichroic mirror 22 also works to join the third exit path P3 into the common optical path of the lighting path Pi. That is, the light ray from the third light emitter E3 is joined into the lighting path Pi at the hindmost position in a light traveling direction. Also, the third dichroic mirror 22 is configured to exert an optical effect on the light ray from the third light emitter E3 and not to exert an optical effect on the other light rays from the first and second light emitters in a traveling direction. Thus, the light source unit 10 can adjust the exit position of the light ray from the third light emitter E3 without exerting an optical effect on the other light rays. In addition, the exit positions of the other light rays are separately adjustable before the light ray from the third light emitter E3 joins with the lighting path, without exerting any optical effects on the traveling light ray from the third light emitter E3. Accordingly, the light source unit 10 can individually adjust the positions of the traveling light rays from the light emitters E1 to E3.

Further, the third dichroic mirror 22 is also configured to reflect the light ray with the wavelength λC and transmit the light rays with the wavelengths λA, λB. Because of this, the light source unit 10 with a simple structure can individually adjust the exit positions of the light ray from the third light emitter as well as easily adjust those of the other light rays separately before this light ray joins the lighting path. Accordingly, the light source unit 10 can individually adjust the positions of the traveling light rays from the light emitters E1 to E3.

Since the light source unit 10 can adjust the exit positions of the three light rays in different wavelength bands λA, λB, λC, it can efficiently emit the three color lights. The three light rays in different wavelength bands λA, λB, λC can be properly incident on the light tunnel 6 of the optical guide 2, improving the lighting efficiency of the three color lights.

The projector 1 according to the first embodiment comprising the light source unit 10 as configured above can generate full color images on the screen Sc more clearly and beautifully.

The light source unit 10 according to the first embodiment can individually adjust the position of traveling light rays from the light emitters E1 to E3.

According to the first embodiment, when used for irradiating the screen Sc, the light ray with the wavelength λA from the first light emitter E1 is the transmissive path of the first lighting system 10A while when used for exciting the phosphor 17b it is the reflective path thereof. Alternatively, when used for irradiating the screen Sc it can be the reflective path and when used for exciting the phosphor 17b it can be the transmissive path. This can be realized by the changing the optical properties of the first and second dichroic mirrors 18, 19 and the arrangement of the fluorescent wheel 17.

Moreover, the optical element 31 can be placed on the first exit path 1 between the total reflection mirror 15 and the reflective and transmissive wheel 14 in place of between the total reflection mirror 15 and the second dichroic mirror 19 in FIG. 2.

Second Embodiment

Figure 14:
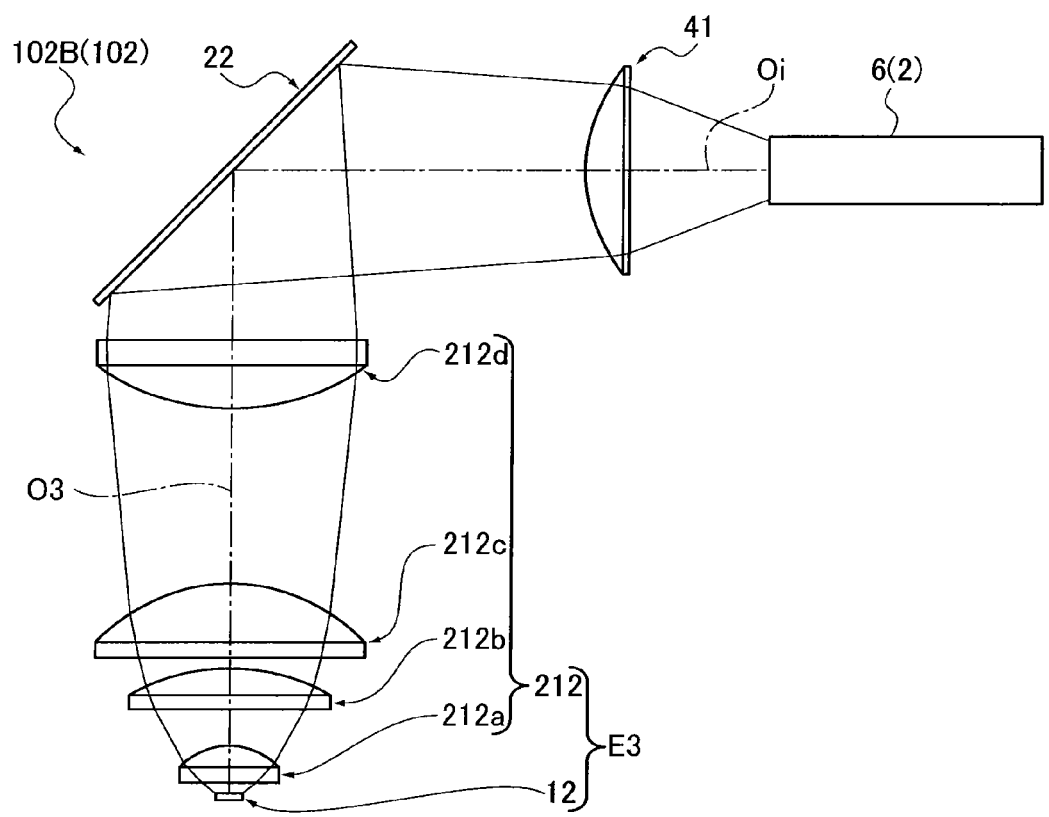
FIG. 14 shows the structure of a second lighting system 102B of a light source unit 102 according to a second embodiment by way of example.

Next, a light source unit 102 according to a second embodiment and the projector 1 incorporating the same are described referring to FIG. 14. FIG. 14 shows an example of the structure of a second lighting system 102B.

The light source unit 102 is different from the light source unit 10 according to the first embodiment in the structure of the second lighting system 102B. The same or like parts are given the same reference numbers and a detailed description thereof is omitted. Also, the structure of the projector 1 is the same as that of the projector 1 in FIG. 1 except for the second lighting system 102B of the light source unit 102.

The second lighting system 102B comprises a light source 12, a third coupling lens 212, a third dichroic mirror 22 and a condensing lens 41. The light source 12 is a red LED to emit the light ray with the wavelength λC in approximate Lambert distribution, as in the first embodiment. The third coupling lens 212 is designed with the distribution of the light ray with the wavelength λC from the light source 12 taken into account.

The third coupling lens 212 comprises four plane-convex lenses 212a, 212b, 212c, 212d aligned on the third exit axis O3 from the light source 12 side. The lenses 212a, 212b, 212c each include a convex surface to the third dichroic mirror 22 side and the lens 212d includes a convex surface to the light source 12 side, facing the lens 212c. The third coupling lens 21 collects the light ray with the wavelength λC from the light source 12 to be incident on the third dichroic mirror 22 and the condensing lens 41. The four lenses 212a, 212b, 212c, 212d of the third coupling lens 212 and the light source 12 form the third light emitter E3 to emit the light with the wavelength λC.

As in the first embodiment, the third dichroic mirror 22 is located at the intersection of the third exit axis O3 and the optical axis Oi to reflect the light ray with the wavelength λC from the third light emitter E3 to the optical axis Oi. The condensing lens 41 is provided on the optical axis Oi.

The condensing lens 41 is placed closer to the exit side than the third dichroic mirror 22 in a light traveling direction, that is, on the common optical path of the lighting path Pi. The condensing lens 41 made of plane-convex lenses in the second embodiment has a positive power to collect the light ray with the wavelength λC reflected by the third dichroic mirror 22 as well as the light rays with the wavelengths λA, λB from the first and second light emitters to be incident on the light tunnel 6 of the optical guide 2. Accordingly, the light source unit 102 can exclude the optical element 31 on the first exit path P1 and the optical element 32 on the second exit path P2, which contributes to reducing the number of the optical elements.

As in the first embodiment, the optical axis Oi of the second lighting system 102B is aligned with the axial line of the light tunnel 6. Therefore, the second lighting system 102B can emit the light ray with the wavelength λC from the third light emitter E3 to the light tunnel 6 of the optical guide 2.

The light source unit 102 or projector 1 according to the second embodiment can attain the same effects as those of the light source unit 10 or projector 1 in the first embodiment.

In addition, the condensing lens 41 with a positive power is provided on the common optical path of the three color lights, which eliminates the necessity for using different condensing lenses for the light rays in different wavelength bands from each other. With a simpler structure, it can properly make the three color lights be incident on the light tunnel 6 of the optical guide 2.

Accordingly, the light source unit 102 in the second embodiment can individually adjust the positions of the traveling lights from the light emitters E1 to E3.

Third Embodiment

Figure 15:
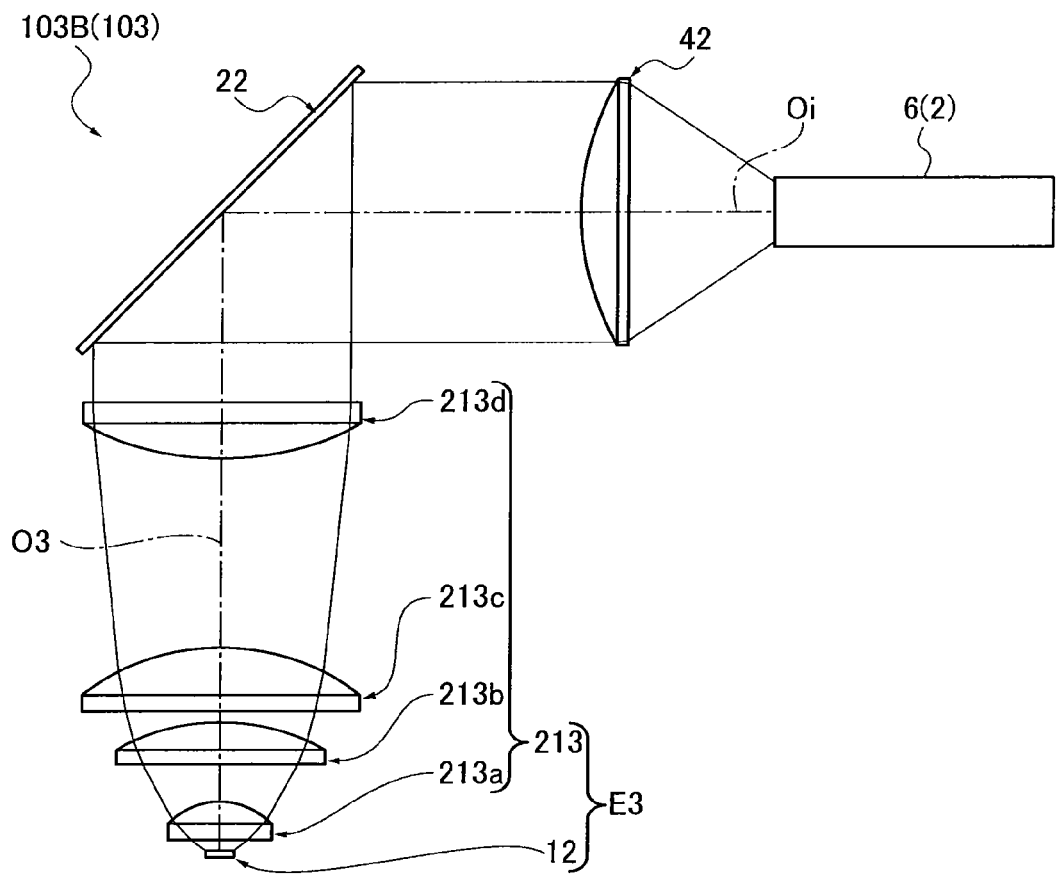
FIG. 15 shows the structure of a second lighting system 103B of a light source unit 103 according to a third embodiment by way of example.
Figure 16:
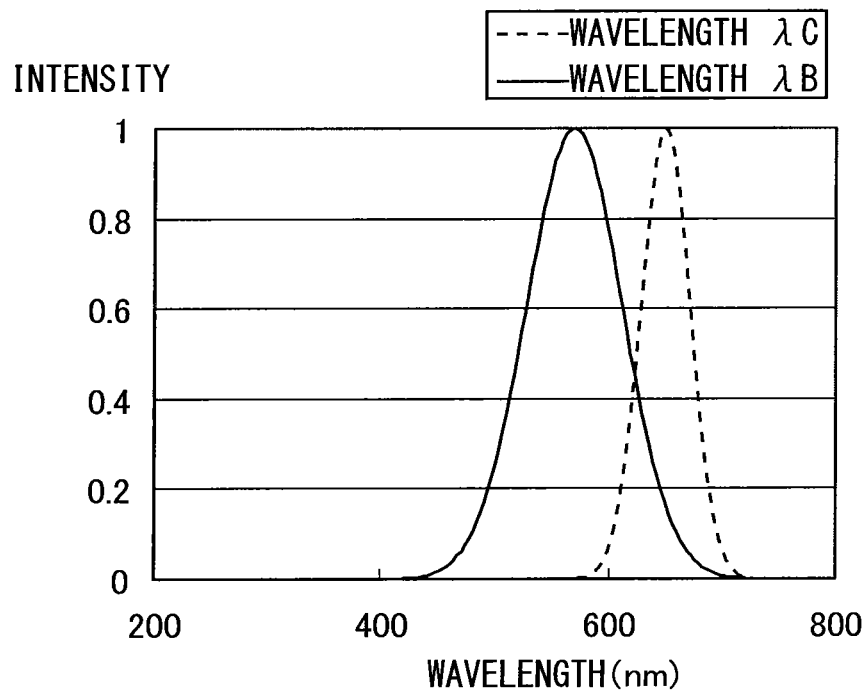
FIG. 16 is a graph showing a ratio of the intensities of light rays to their wavelengths $\lambda B$, $\lambda C$.
Figure 17:
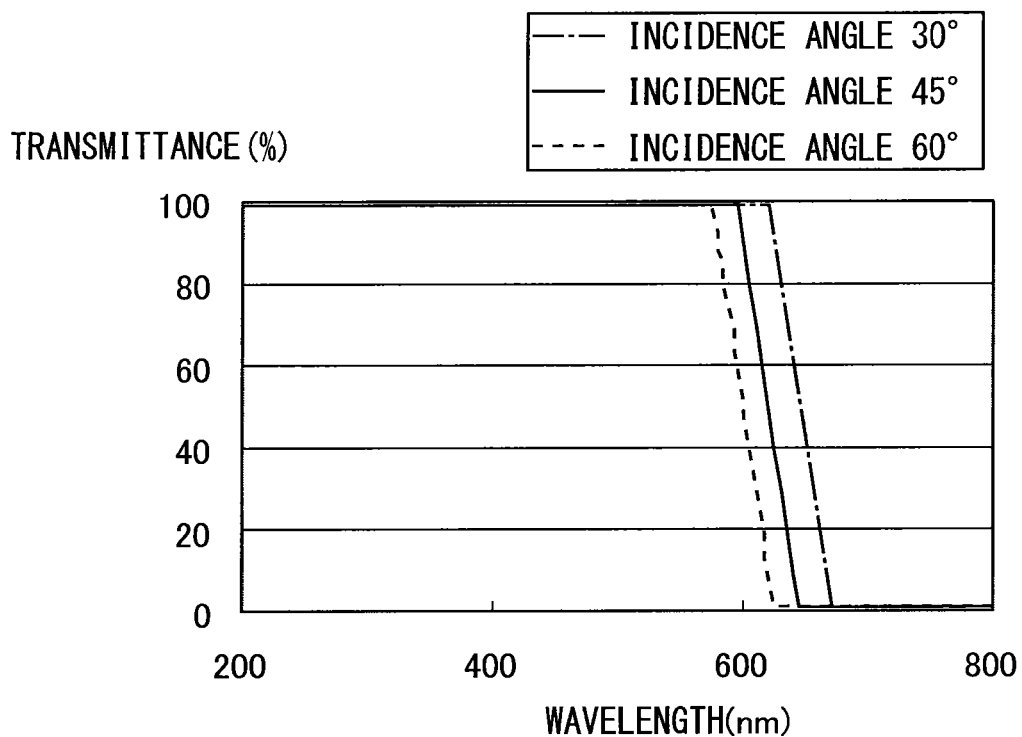
FIG. 17 is a graph showing an example of the spectroscopic characteristic of a third dichroic mirror 22.

Now, a light source unit 103 according to a third embodiment and a projector 1 incorporating the same are described referring to FIGS. 15 to 17. FIG. 15 shows an example of the structure of a second lighting system 103B of the light source unit 103. FIG. 16 is a graph showing the ratio of intensity of the light rays with the wavelengths λB, λC to the respective wavelengths. FIG. 17 is a graph showing an example of the spectroscopic characteristic of the third dichroic mirror 22.

The light source unit 103 is different from the light source units 10, 102 in the first and second embodiments in a second lighting system 103B. The same or like parts are given the same reference numbers and a detailed description thereof is omitted. Also, the structure of the projector 1 is the same as that of the projector 1 in FIG. 1 except for the second lighting system 103B of the light source unit 103.

The second lighting system 103B of light source unit 103 comprises the light source 12, a third coupling lens 213, a third dichroic mirror 22, and a condensing lens 42. As in the first embodiment, the light source 12 is a red LED to emit the light ray with the wavelength λC in approximate Lambert distribution. The third coupling lens 213 is designed with the distribution of the light ray with the wavelength λC from the light source 12 taken into account.

The third coupling lens 213 comprises four plane-convex lenses 213a, 213b, 213c, 2132d aligned on the third exit axis O3 from the light source 12 side. The lenses 213a, 213b, 213c each include a convex surface on the third dichroic mirror 22 side and the lens 213d includes a convex surface to the light source 12 side, facing the lens 213c. The third coupling lens 21 is a collimated optical system and converts the light ray with the wavelength λC from the light source 12 to a collimated or parallel light ray to be incident on the third dichroic mirror 22 and the condensing lens 42. The four lenses 213a, 213b, 213c, 213d of the third coupling lens 212 and the light source 12 form the third light emitter E3 to emit the light with the wavelength λC.

As in the first embodiment, the third dichroic mirror 22 is located at the intersection of the third exit axis O3 and the optical axis Oi to reflect the light ray with the wavelength λC from the third light emitter E3 to the optical axis Oi. The condensing lens 42 is provided on the optical axis Oi.

The condensing lens 42 is placed closer to the exit side than the third dichroic mirror 22 in a light traveling direction, that is, on the common optical path of the lighting path Pi. The condensing lens 42 in the third embodiment has a positive power to collect the light ray with the wavelength λC reflected by the third dichroic mirror 22 as well as the light rays with the wavelengths λA, λB from the first and second light emitters to be incident on the light tunnel 6 of the optical guide 2. Accordingly, the light source unit 102 can exclude the optical element 31 on the first exit path P1 and the optical element 32 on the second exit path P2, which contributes to reducing the number of the optical elements.

As in the first embodiment, the optical axis Oi of the second lighting system 103B is aligned with the axial line of the light tunnel 6. Therefore, the second lighting system 102B can emit the light ray with the wavelength λC from the third light emitter E3 to the light tunnel 6 of the optical guide 2.

The collimating effect of the third coupling lens 213 of the light source unit 103 is described in the following.

In the first embodiment the phosphor 17b generates a fluorescence with the wavelength λB (450 nm<λB<700 nm) while the light source 12 (LED) emits a light ray with the wavelength λC (600 nm<λC<700 nm), as shown in FIG. 16. The distributions of the two wavelengths in the graph overlap in some area. As in the first and second embodiments, the third dichroic mirror 22 converges the light ray with the wavelength λC from the light source 12 on the common optical path of the lighting path Pi. The light ray with the wavelength λB passing through the common optical path also transmits through the third dichroic mirror 22. With a cutoff wavelength set, the third dichroic mirror 22 functions to reflect or transmit light with beyond the cutoff wavelength and transmit or reflect light with under the cutoff wavelength, for example. If the spectroscopic property thereof is set to transmit a larger amount of the light ray with the wavelength λB, an amount of the light ray with the wavelength λC to be reflected is decreased since the two wavelengths partially overlap. Likewise, if the third dichroic mirror 22 is set to reflect a larger amount of the light ray with the wavelength λC, an amount of the light ray with the wavelength λB to be transmitted is decreased.

In view of the above, the spectroscopic property of the third dichroic mirror 22 of the light source unit 103 is designed as shown in FIG. 17 by way of example. The third light emitter E3 is positioned so that the third exit axis O3 is orthogonal to the optical axis Oi. Therefore, the third dichroic mirror 22 is inclined at 45 degrees relative to the third exit axis O3 or the traveling direction of the light ray with the wavelength λC, to convert the light ray to a collimated ray. This makes it possible to prevent an increase in the diameter of the condensing lens 42 and make the light ray with the wavelength λC be efficiently incident on the condensing lens 42. In FIG. 17 the spectroscopic property of the third dichroic mirror 22 is designed such that it exerts transmittance of 50% on a light ray with incidence angle of 45 degrees and a wavelength of 620 nm. The spectroscopic property of the third dichroic mirror 22 should not be limited to this example in FIG. 17. Shifting the spectroscopic property to a short wavelength side can enhance the efficiency of the light ray with the wavelength λC while shifting it to a long wavelength side can enhance that of the light ray with the wavelength λB.

The spectroscopic property of the third dichroic mirror 22 is shifted in accordance with the incidence angle of light, that is, it depends on the incidence angle, as shown in FIG. 17. Specifically, the smaller the incidence angle, the more the spectroscopic property is shifted to the long wavelength side (incidence angle 30 degrees relative to 45 degrees), and the larger the incidence angle, the more the spectroscopic property is shifted to the short wavelength side (incidence angle 45 degrees to 60 degrees). This means that at the incidence angle of 30 degrees, the third dichroic mirror 22 reflects the light ray with the wavelength λC from the third light emitter E3 at a lower rate than that at the incidence angle of 45 degrees. To prevent this, the third coupling lens 21 is provided to convert the light ray with the wavelength λC to a collimated light ray. Thus, the reflection rate of the third dichroic mirror 22 can be a desired value.

Figure 18:
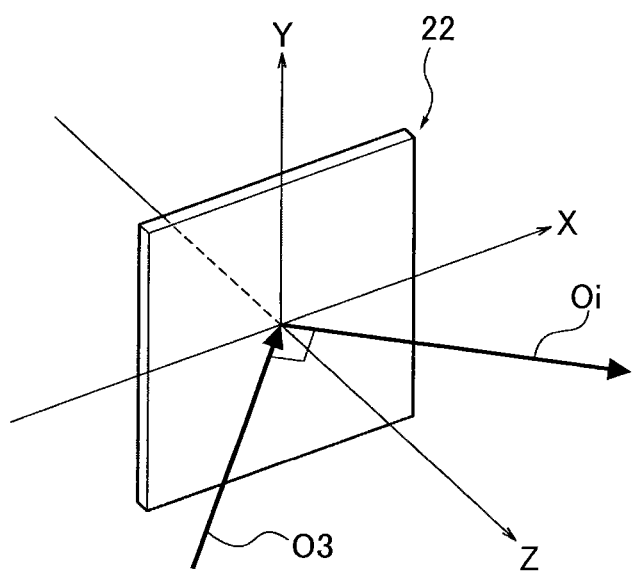
FIG. 18 shows the third dichroic mirror 22 and XYZ axes defined therefor.

Referring to FIG. 18, XYZ axes are defined in the third dichroic mirror 22. A direction orthogonal to the third dichroic mirror 22 is Z axis, a direction parallel thereto is X axis, and the third exit axis O3 and optical axis Oi are on X to Z plane. Y axis is orthogonal to X axis and Z axis. An angle relative to Z axis is α direction in Y to Z plane and β direction in X to Z plane.

Figure 19:
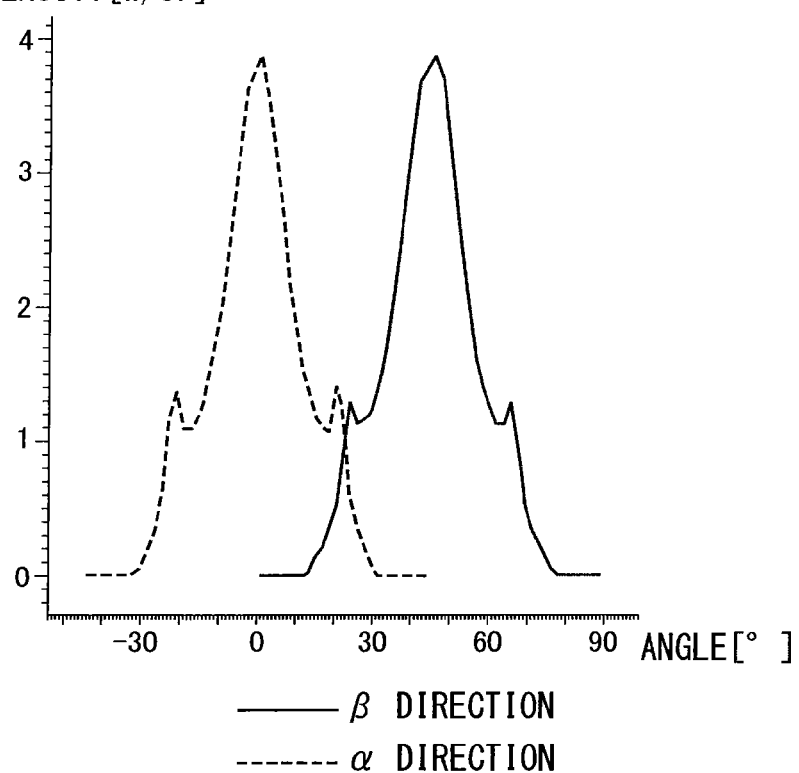
FIG. 19 is a graph showing a distribution in the radiation intensity of the light ray with the wavelength $\lambda C$ from a third light emitter E3 of the second lighting system 10B of the light source unit 10 on the third dichroic mirror 22 relative to the incidence angle according to the first embodiment.
Figure 20:
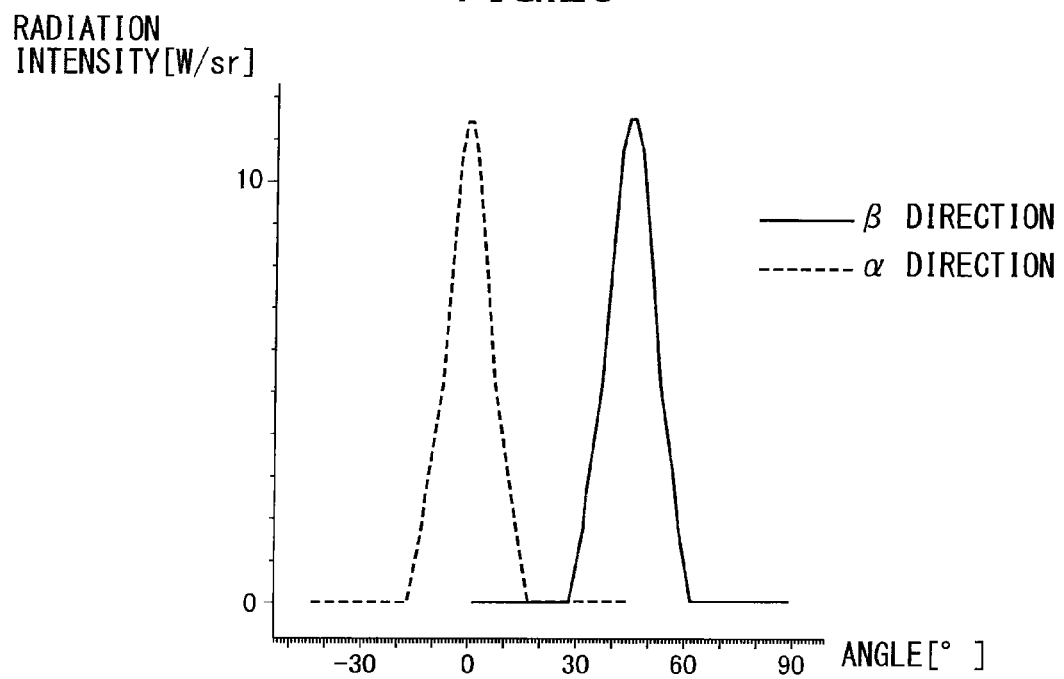
FIG. 20 is a graph showing a distribution in the radiation intensity of the light ray with the wavelength $\lambda C$ from the third light emitter E3 of the second lighting system 102B of the light source unit 102 on the third dichroic mirror 22 relative to the incidence angle according to the second embodiment.
Figure 21:
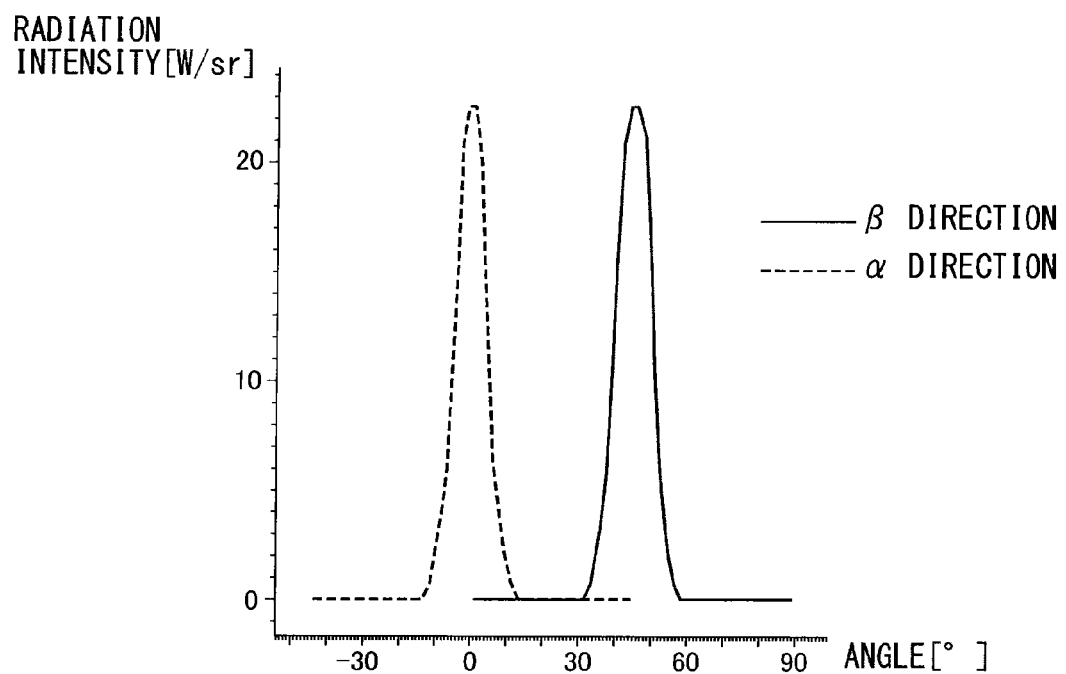
FIG. 21 is a graph showing a distribution in the radiation intensity of the light ray with the wavelength λC from the third light emitter E3 of the second lighting system 103B of the light source unit 103 on the third dichroic mirror 22 relative to the incidence angle according to the third embodiment.

FIG. 19 to FIG. 21 show the distributions in the radiation intensity of the light ray with the wavelength λC from the third light emitter E3 on the third dichroic mirror 22 relative to the incidence angle. FIG. 19 to FIG. 21 correspond to the second lighting systems 10B, 102B, 103B of the light source units 10, 102, 103 in FIGS. 13 to 15 according to the first to third embodiments, respectively. As seen from FIG. 21, in the second lighting system 103B the light ray with the wavelength λC is incident on the third dichroic mirror 22 at an angle in the ranges of 0±10 degrees in α direction and 45±10 degrees in β direction. Thus, the light ray with the wavelength λC is incident on the third dichroic mirror 22 at about 45 degrees. This is because the third coupling lens 213 collimates the light ray with the wavelength λC. In comparison with FIGS. 19, 20, the second lighting system 103B can reduce the range of the incidence angles to an extremely narrow range.

The light source unit 103 or projector 1 according to the third embodiment can attain the same effects as those of the light source unit 10 or projector 1 in the first embodiment.

In addition, owing to the third coupling lens 213 collimating the light ray with the wavelength λC, the light source unit 103 can decrease the extent of the light ray with the wavelength λC incident on the third dichroic mirror 22. This allows the third dichroic mirror 22 to reflect the light ray with the wavelength λC at a preset rate and the light source unit 103 can emit a preset amount of the light ray with the wavelength λC from the third dichroic mirror 22.

Therefore, the light source unit 103 can set the amount of the light ray with the wavelength λC in a balanced manner relative to the light rays with the wavelength λA, λB from the first and second light emitters.

Further, in the light source unit 103 the third dichroic mirror 22 is inclined at 45 degrees to the third exit axis O3 or the light ray with the wavelength λC. Because of this, the light source unit 103 can make the light ray with the wavelength λC collimated by the third coupling lens 213 be efficiently incident on the condensing lens 42 while prevent an increase in the diameter of the condensing lens 42. Accordingly, without an increase in the size of the light source unit 103, the light ray with the wavelength λC from the light source 12 can be properly incident on the light tunnel 6.

Owing to the condensing lens 42 having a positive power provided on the common optical path, the light source unit 103 does not need to include separate condensing lenses for the three light rays with different wavelengths. Therefore, with a simpler structure, it can reliably make the three color light rays incident on the light tunnel 6 of the optical guide 2.

Because of the light source unit 103 to be able to emit the amounts of the three color lights in a balanced manner, the projector 1 comprising the same can generate full color images more clearly and beautifully on the screen Sc.

The light source unit 103 according to the third embodiment can individually adjust the positions of traveling lights from the light emitters E1 to E3.

The structures of the light source unit should not be limited to those of the light source units 10, 102, 103 according to the first to third embodiments. It can be arbitrarily structured as long as a light source unit to emit a light ray on a single optical axis, comprises a first light emitter to emit a light ray in a certain wavelength band, a second light emitter to emit a light ray in a wavelength band different from that of the first light emitter, a third light emitter to emit a light ray in a wavelength band different from the wavelength bands of the first and second light emitters, a lighting path through which the light rays from the first, second, and third light emitters are guided to propagate on the optical axis and into which the light ray from the third light emitter is joined at a hindmost position in a light traveling direction on the optical axis, and an optical adjuster to exert an optical effect on the light ray from the third light emitter and not to exert an optical effect on the light rays from the first and second light emitters in the light traveling direction on the lighting path.

The above embodiments have described an example where the first light source is a blue laser diode, the second light source is a phosphor, and the third light source is an LED. However, solid light emitting elements including laser diode and LED can be arbitrarily used for the light sources as long as they can adjust the position of traveling light rays from the light emitters individually.

The above embodiments have described an example where the first to third light emitters E1 to E3 emit blue, green, red light rays with the wavelengths λA, λB λC, respectively. However, the colors of the light rays can be arbitrarily set. For example, the colors of the light rays from the first to third light emitters E1 to E3 can be green, red, blue, respectively. This can be realized by using optical elements suitable for the color setting as the light sources 11, 12, phosphor 17b, and dichroic mirrors 18, 19, 22 without changing the structures of the first to third embodiments.

The above embodiments have described an example where the phosphor 17b of the second light emitter E2 generates a fluorescence with the wavelength λB in a direction to reflect the light ray with the wavelength λA. Alternatively, the phosphor 17b can be configured to emit it in a direction to transmit therethrough.

Although the present invention has been described in terms of exemplary embodiments, it is not limited thereto. It should be appreciated that variations or modifications may be made in the embodiments described by persons skilled in the art without departing from the scope of the present invention as defined by the following claims. The numbers, positions, and shapes of the relative elements can be arbitrarily decided.

What is claimed is:

1. A light source unit to emit a light ray on a single optical axis, comprising:
    a first light emitter to emit a light ray in a certain wavelength band;
    a second light emitter to emit a light ray in a wavelength band different from that of the first light emitter;
    a third light emitter to emit a light ray in a wavelength band different from the wavelength bands of the first and second light emitters;
    a lighting path through which the light rays from the first, second, and third light emitters are guided to propagate on the optical axis and into which the light ray from the third light emitter is joined at a hindmost position in a light traveling direction on the optical axis; and
    an optical adjuster to exert an optical effect on the light ray from the third light emitter and not to exert an optical effect on the light rays from the first and second light emitters in the light traveling direction on the lighting path,
    wherein the optical adjuster transmits the light rays from the first and second light emitters and reflect the light ray from the third light emitter,
    wherein the lighting path includes a first exit path for guiding the light ray from the first light emitter to the optical axis, a second exit path for guiding the light ray from the second light emitter to the optical axis, and a third exit path for guiding the light ray from the third light emitter to the optical axis,
    wherein the optical adjuster is provided on the third exit path, and
    wherein the first exit path includes a mirror that reflects the light ray from the first light emitter on the optical axis,
    wherein the second exit path includes a first dichroic mirror that reflects the light ray from the second light emitter, and
    wherein a second dichroic mirror, that transmits the light ray reflected by the mirror and reflects the light ray reflected by the first dichroic mirror on the optical axis, is disposed in an intersection of the first exit path and the second exit path.

2. The light source unit according to claim 1, further comprising:

a first optical adjuster to exert an optical effect on the light ray from the first light emitter and not to exert an optical effect on the light rays from the second and third light emitters in a traveling direction on the lighting path; and a second optical adjuster to exert an optical effect on the light ray from the second light emitter and not to exert an optical effect on the light rays from the first and third light emitters in a traveling direction on the lighting path, wherein the optical adjuster is a third optical adjuster.

3. The light source unit according to claim 2, wherein the first optical adjuster is provided on the first exit path; and the second optical adjuster is provided on the second exit path.

4. The light source unit according to claim 3, wherein:

the first light emitter includes a first light source to emit a light ray in a certain wavelength band;

the second light emitter includes a second light source as a phosphor to emit a fluorescence using the light ray from the first light source as excitation light; and the third light emitter includes a third light source to emit a light ray in a different wavelength band from those of the light ray from the first light source and the fluorescence from the phosphor, the light source unit further comprising an optical path switch provided on the first exit path to switch between an optical path for guiding the light ray from the first light source to the optical axis and an optical path for guiding the light ray from the first light source to the phosphor.

5. The light source unit according to claim 4, wherein:

the third exit path is located behind the first and second exit paths in a light traveling direction on the optical axis to guide the light ray from the third light source of the third light emitter to the optical axis; and the third light source is a light emitting diode.

6. The light source unit according to claim 4, wherein the third exit path is located behind, the first and second exit paths in a light traveling direction on the optical axis to guide the light ray from the third light source of the third light emitter to the optical axis; and the first light source is a laser diode.

7. The light source unit according to claim 4, wherein the second exit path is located behind the first exit path in a light traveling direction on the optical axis to guide the light ray from the second light source of the second light emitter to the optical axis; and the third optical adjuster is a third dichroic mirror to converge the light ray from third light source of the third light emitter on the optical axis.

8. The light source unit according to claim 4, further comprising a condensing lens with a positive power provided behind the first, second, and third exit paths in a light traveling direction on the lighting path.

9. The light source unit according to claim 4, wherein:

the first light emitter includes a first coupling lens to collect the light ray from the first light source;

the second light emitter includes a second coupling lens to collect the fluorescence from the phosphor; and the third light emitter includes a third coupling lens to collect the light ray from the third light source.

10. The light source unit according to claim 9, wherein the third coupling lens is an optical collimator to collimate the light ray from the third light source.

11. The light source unit according to claim 2, wherein the mirror is the first optical adjuster; and the first and second dichroic mirrors are the second optical adjuster.

12. A projector comprising the light source unit according to claim 1.

* * * * *